Figure 6:
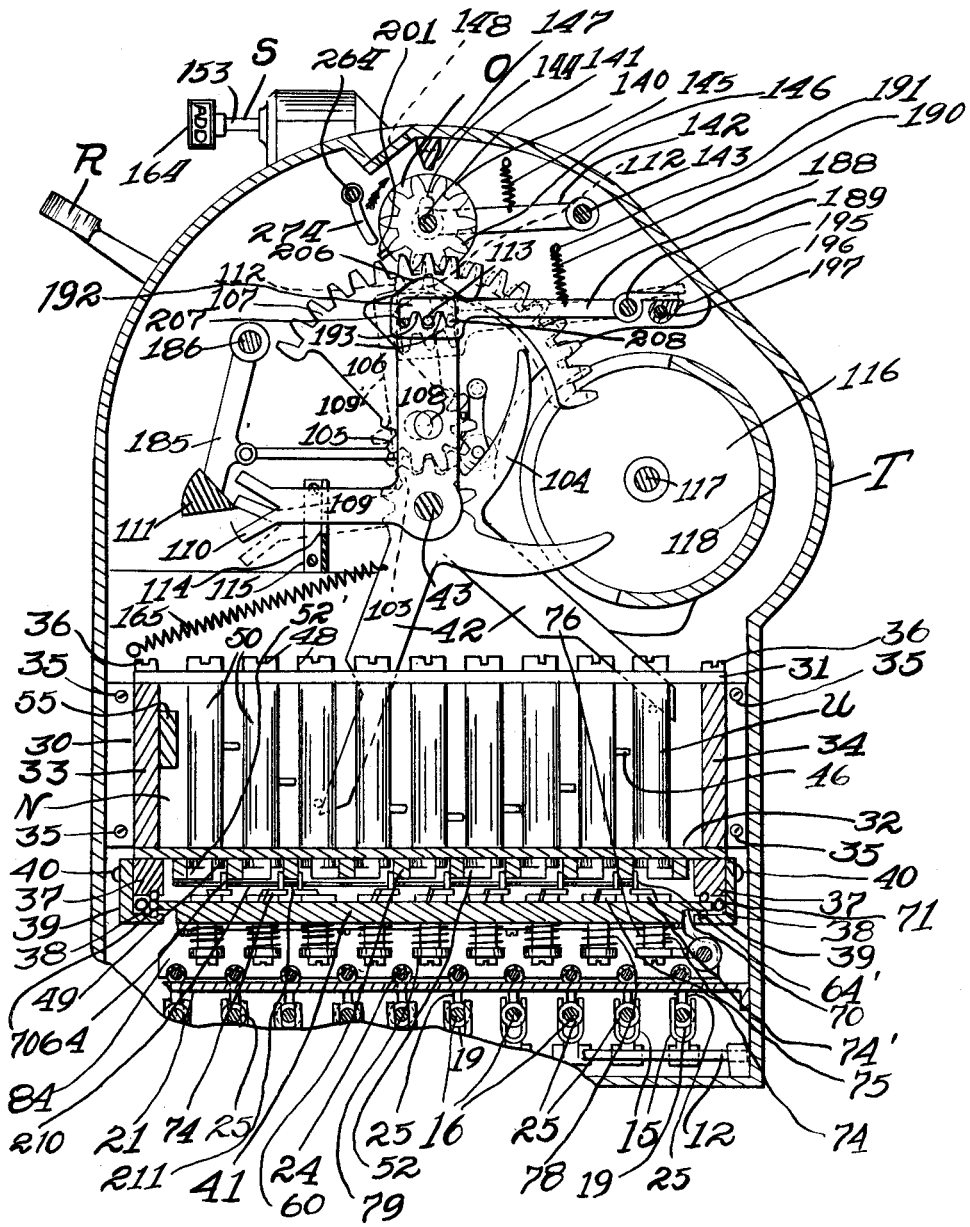

N. J. KLOHN & H. J. HEDTKE.
COMPUTING MACHINE.
APPLICATION FILED AUG. 25, 1913.
1,179,934.
Patented Apr. 18, 1916.
16 SHEETS—SHEET 1.
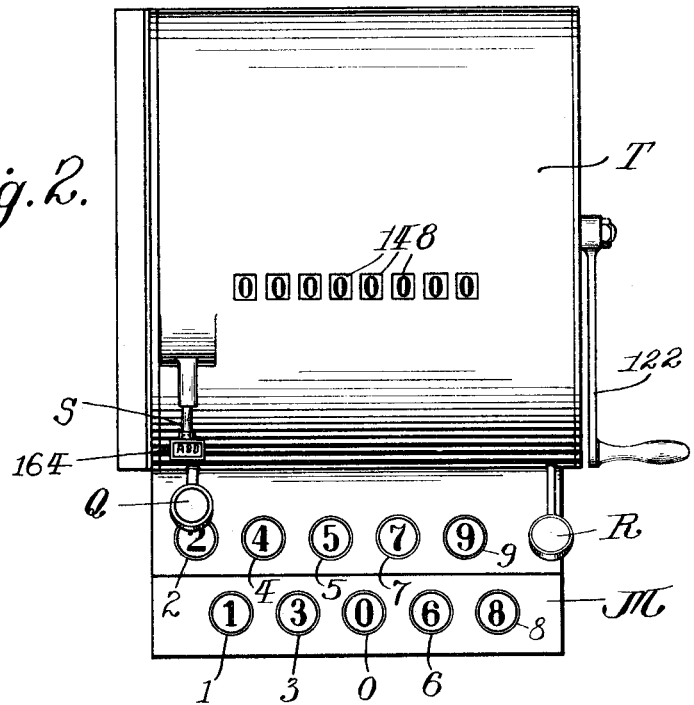
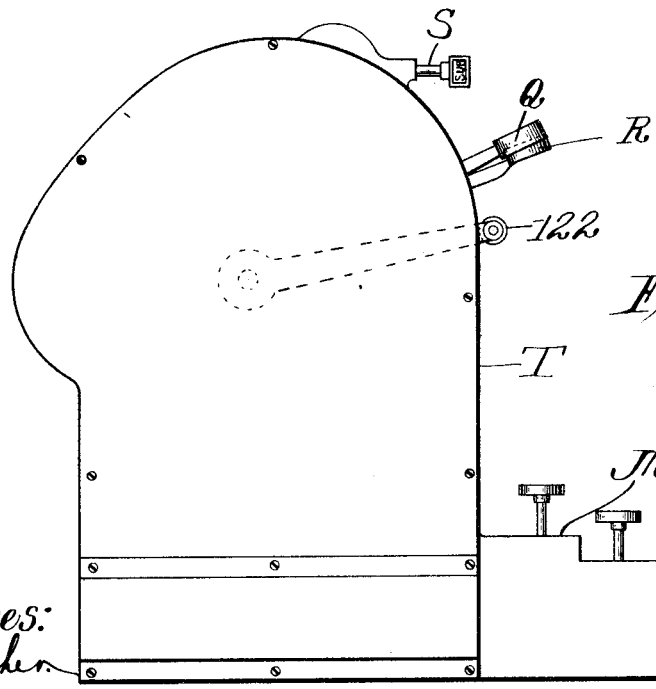
Witnesses:
H. Fischer
S. L. Waschenberger
Inventors:
Nicholas J. Klohn
and
Herman J. Hedtke
by D. Bradbury
Attorney.

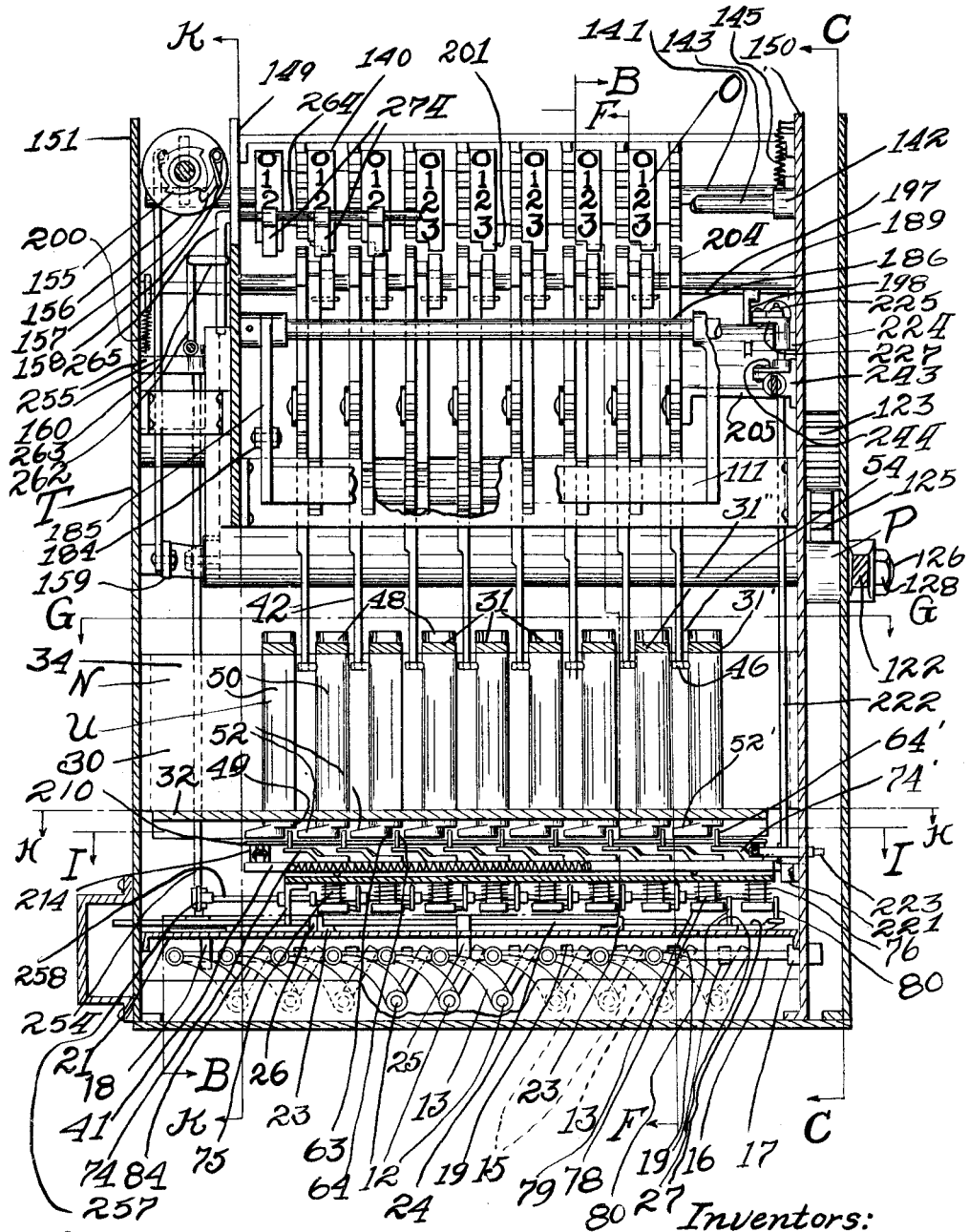

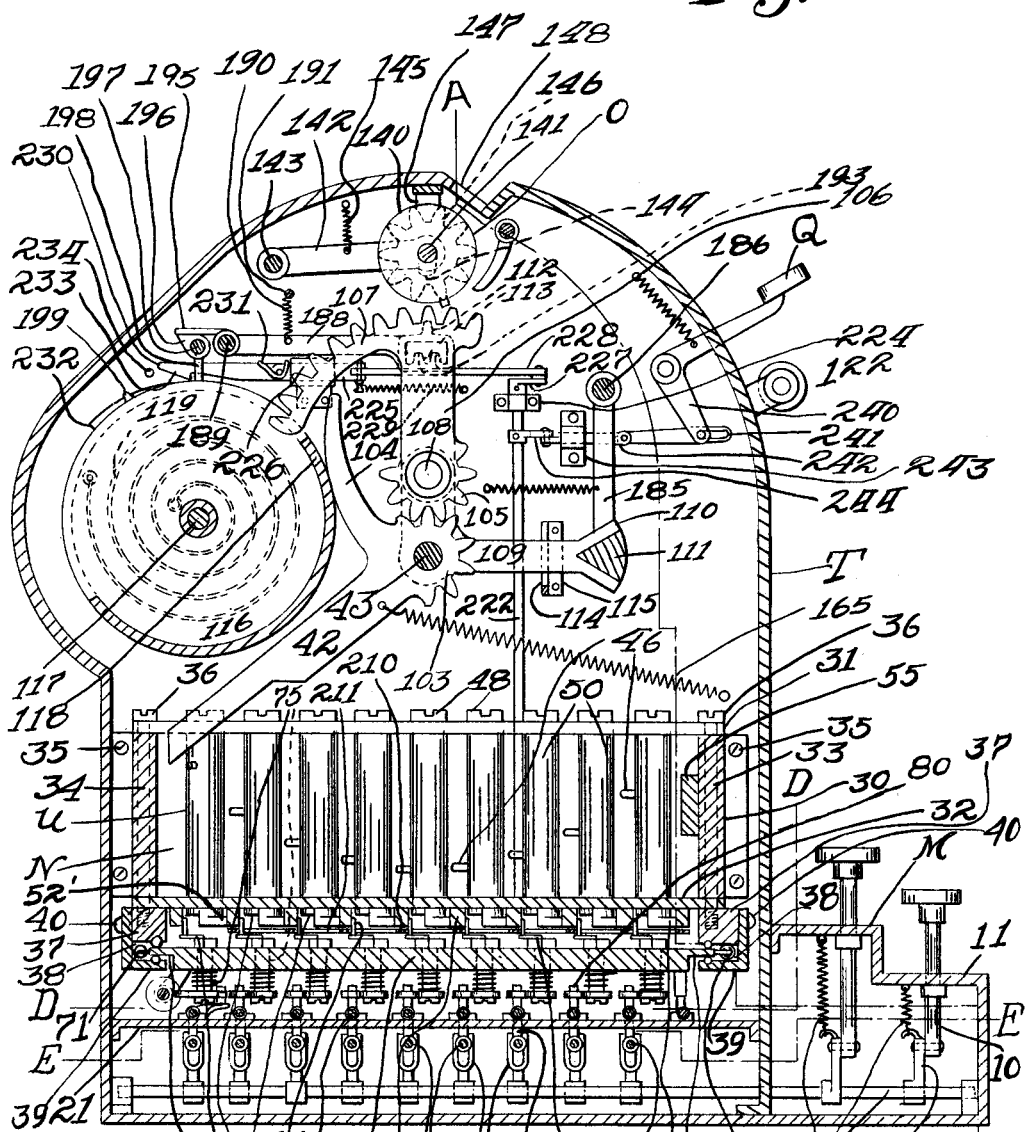

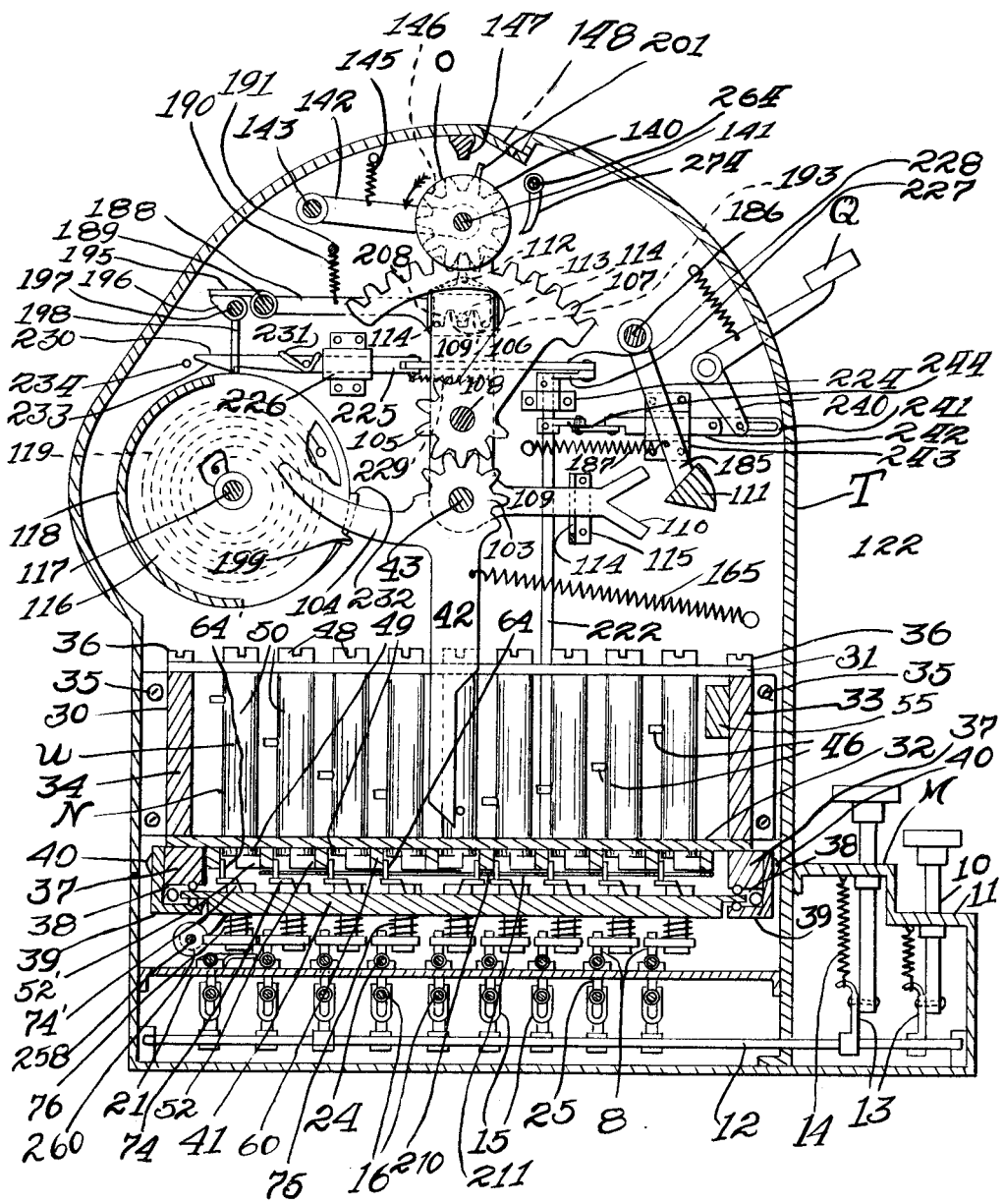

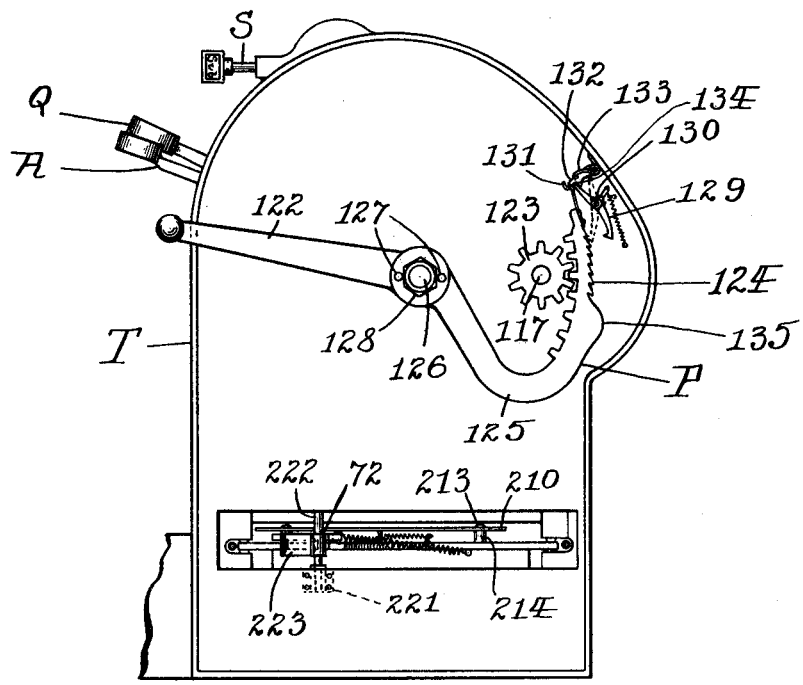
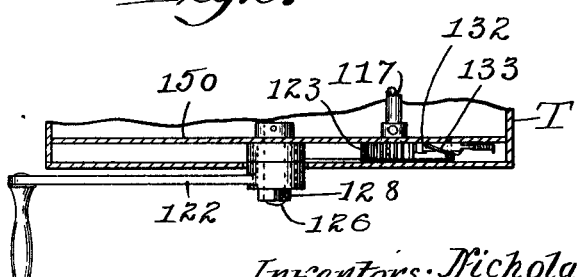

N. J. KLOHN & H. J. HEDTKE.
COMPUTING MACHINE.
APPLICATION FILED AUG. 25, 1913.

1,179,934.

Patented Apr. 18, 1916.
16 SHEETS—SHEET 7.

N. J. KLOHN & H. J. HEDTKE.
COMPUTING MACHINE.
APPLICATION FILED AUG. 25, 1913.

1,179,934.  Patented Apr. 18, 1916.
16 SHEETS—SHEET 9.

Witnesses:
Inventors: Nicholas J. Klohn and Herman J. Hedtke.
Attorney.

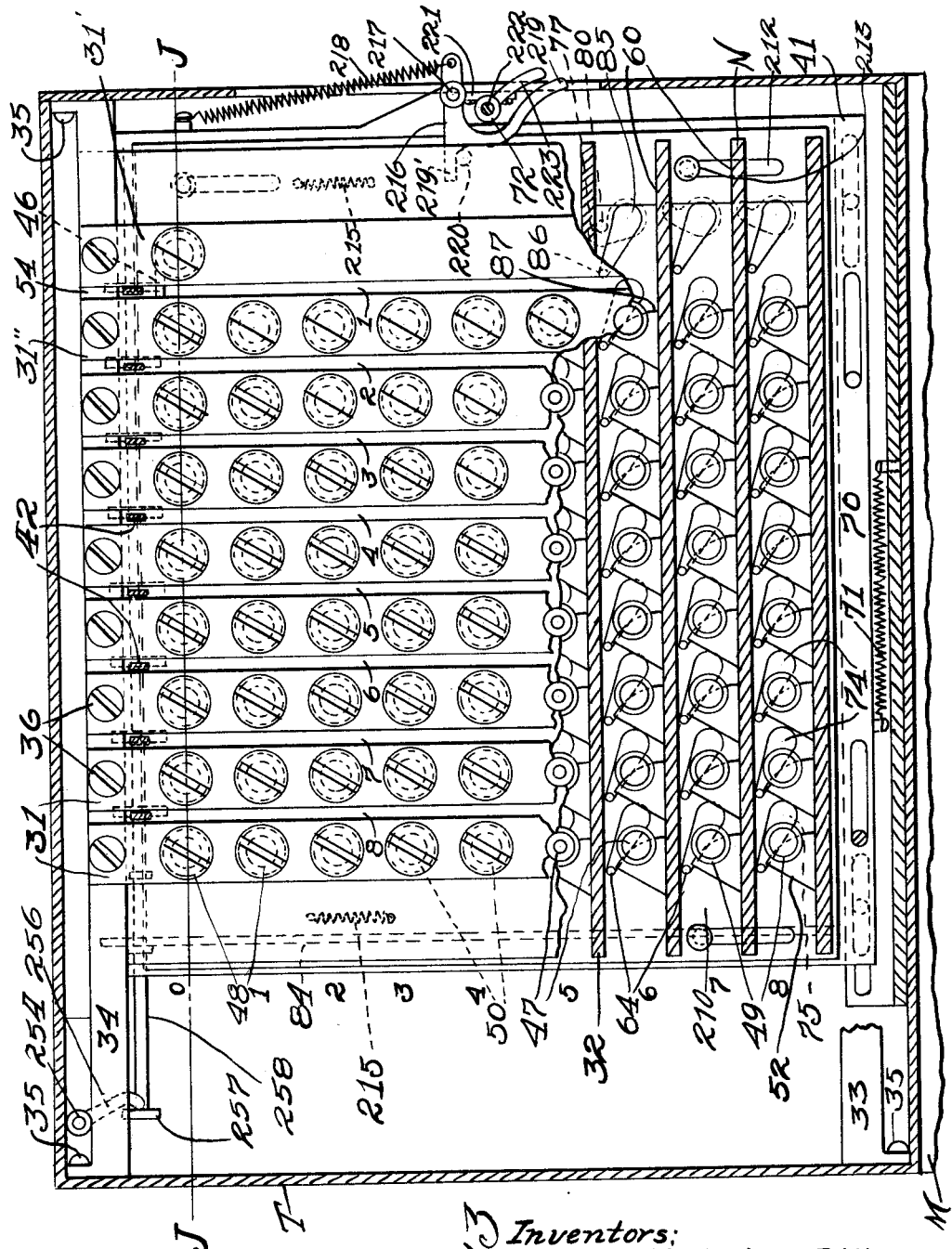

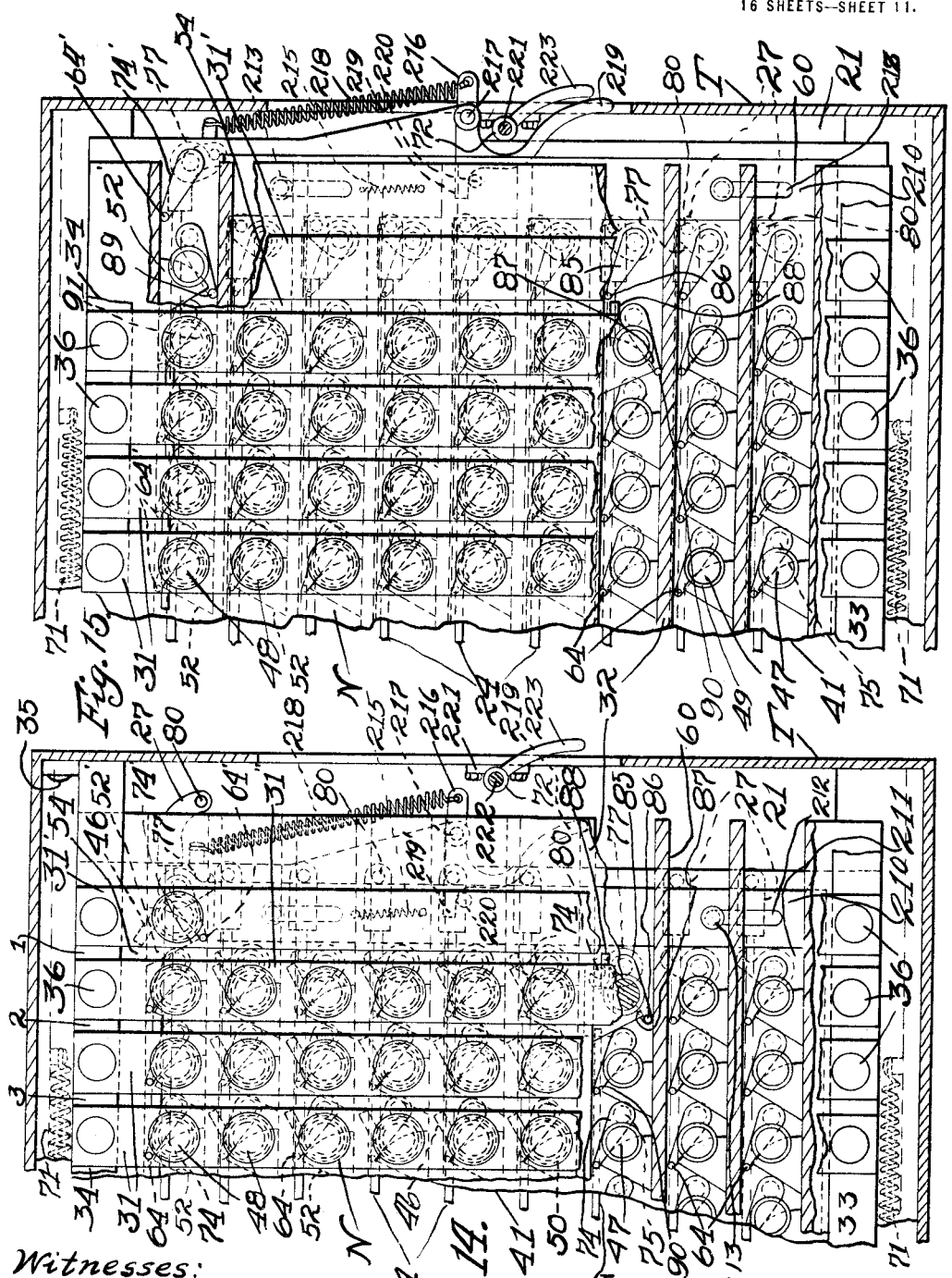

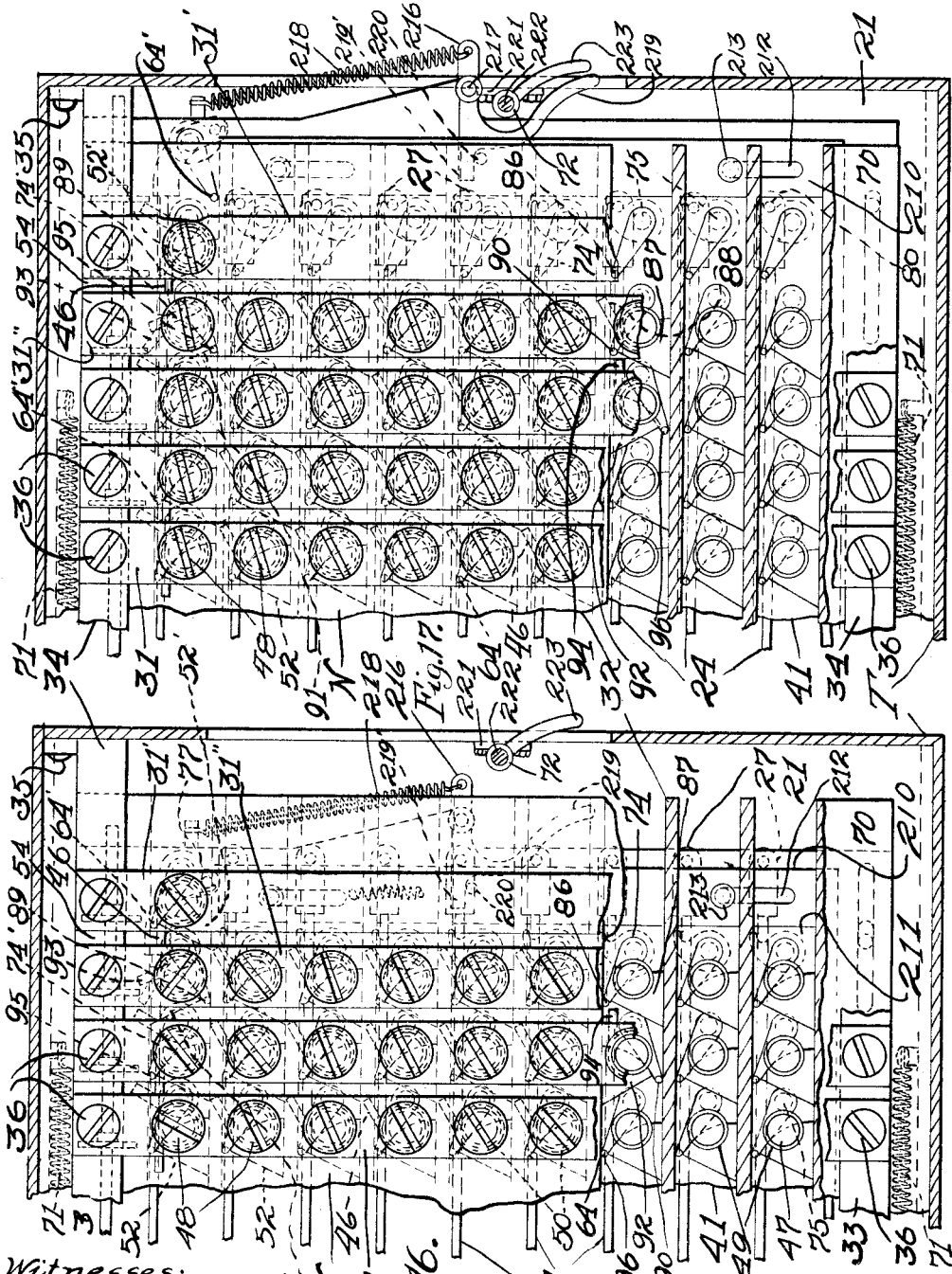

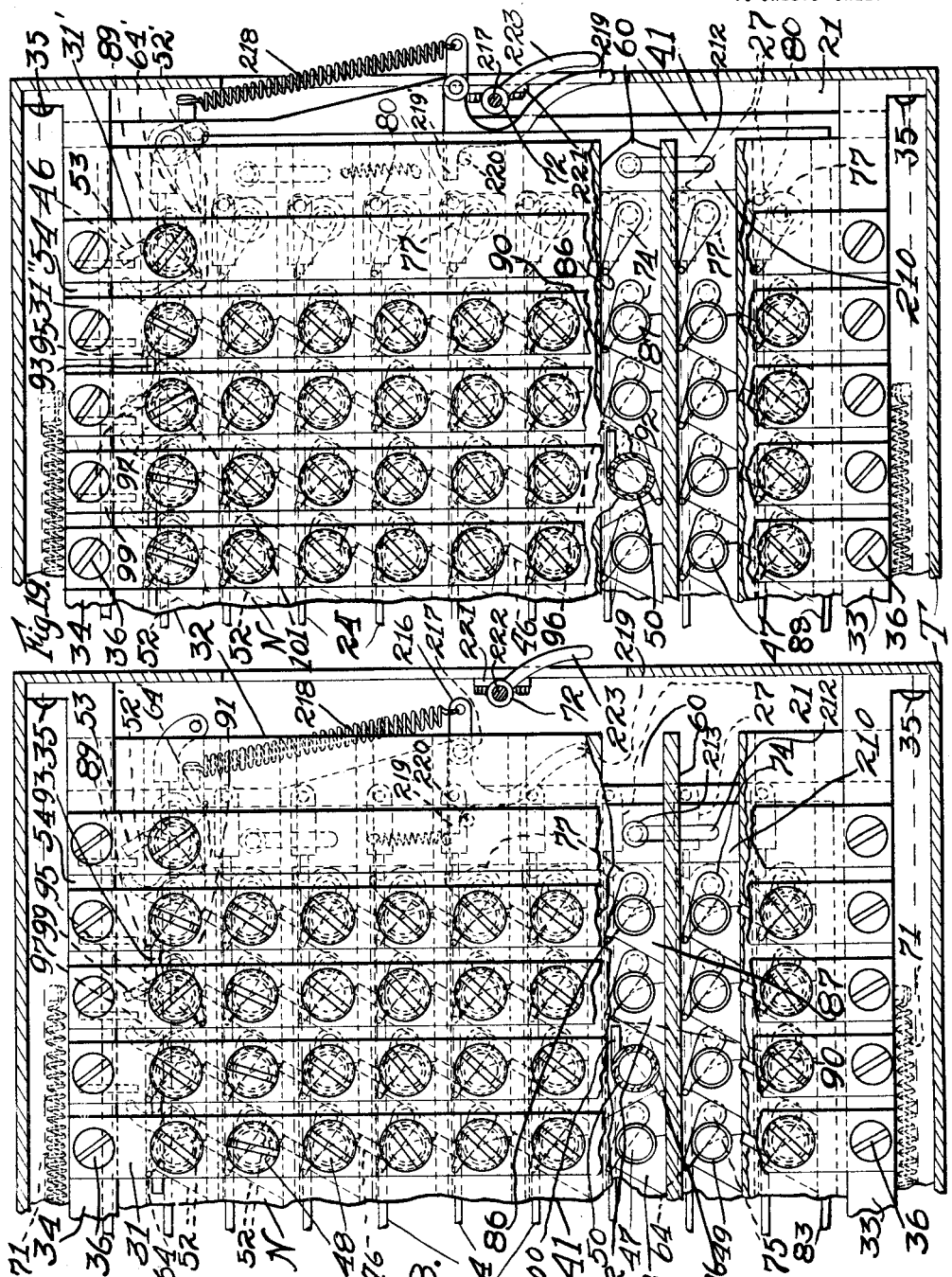

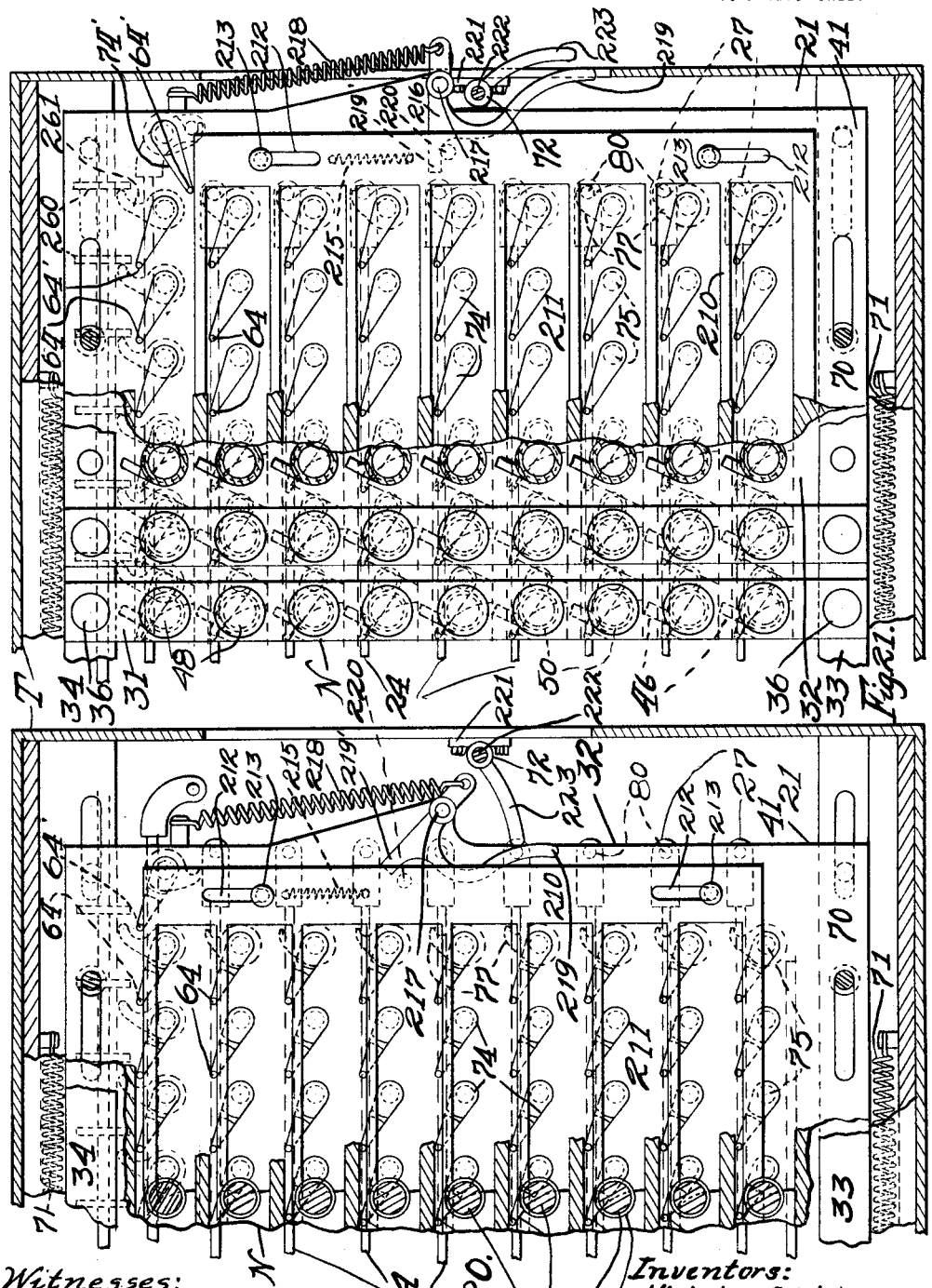

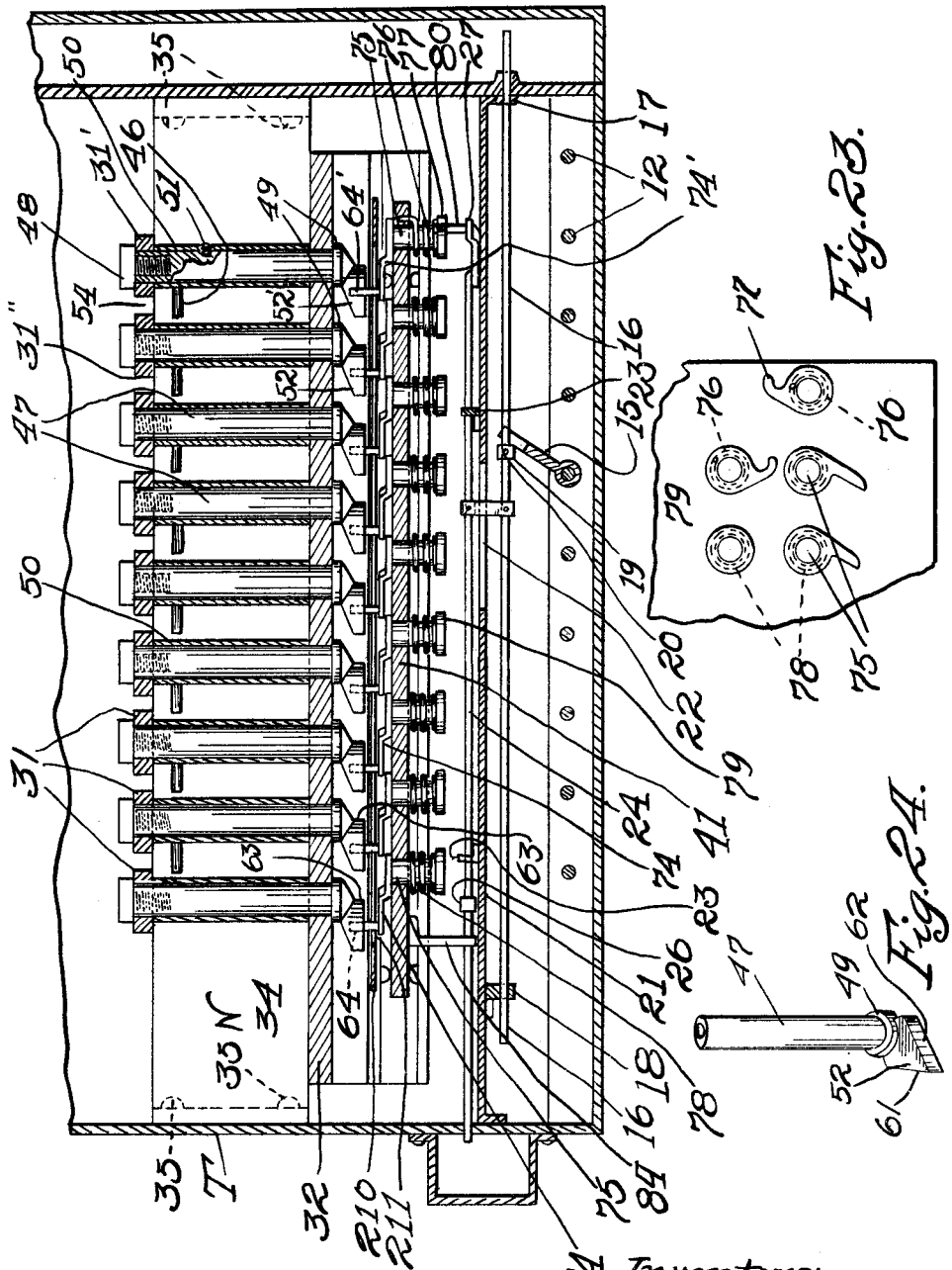

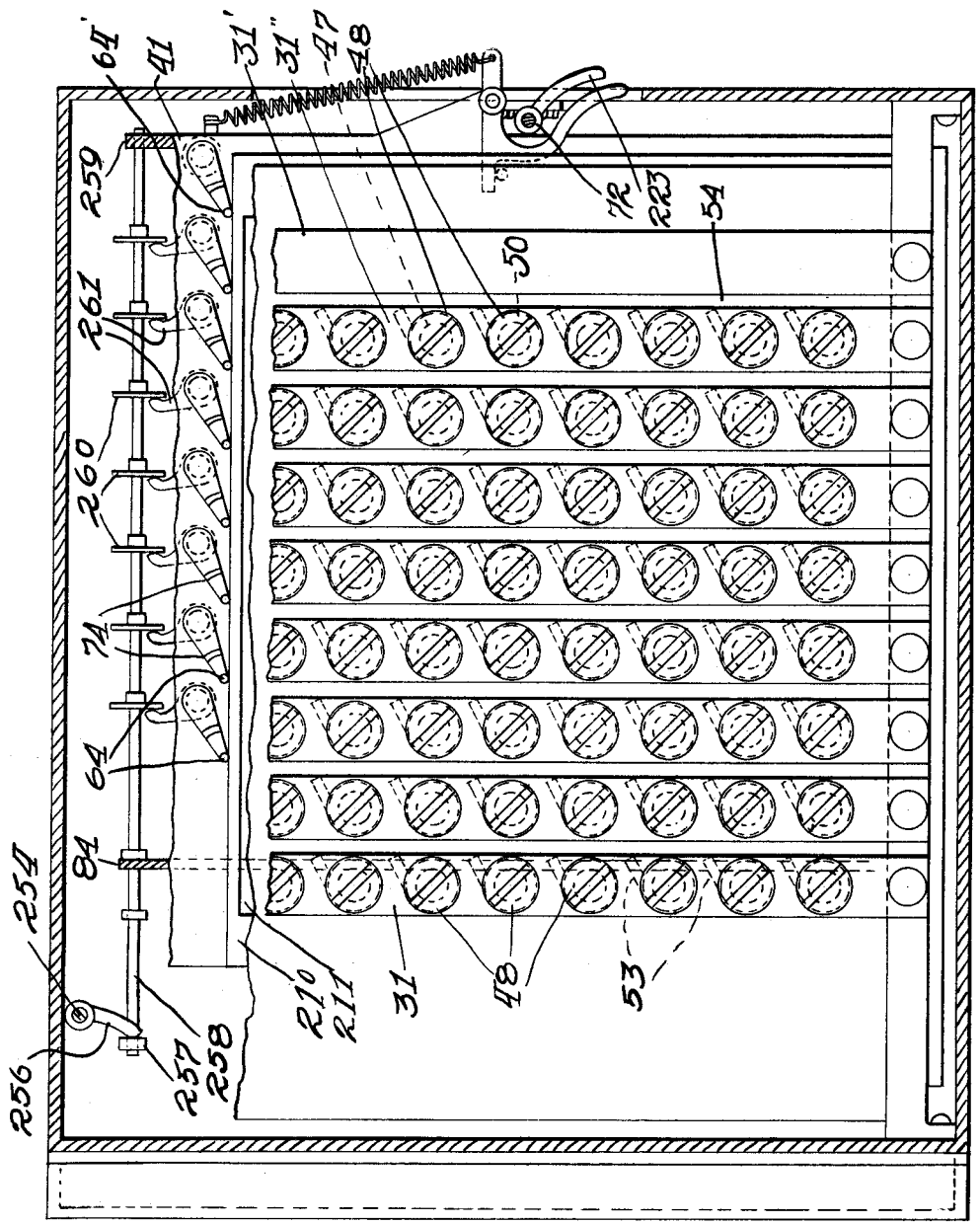

UNITED STATES PATENT OFFICE.

NICHOLAS J. KLOHN, OF ST. PAUL, AND HERMAN J. HEDTKE, OF FORT SNELLING, MINNESOTA, ASSIGNORS TO KLOHN ADDING MACHINE COMPANY, OF MINNEAPOLIS, MINNESOTA, A CORPORATION OF SOUTH DAKOTA.

COMPUTING-MACHINE.

1,179,934.   Specification of Letters Patent.   Patented Apr. 18, 1916.

Application filed August 25, 1913. Serial No. 786,458.

*To all whom it may concern:*

Be it known that we, NICHOLAS J. KLOHN and HERMAN J. HEDTKE, citizens of the United States, residing, respectively, at St. Paul, in the county of Ramsey and State of Minnesota, and at Fort Snelling, in the county of Hennepin and State of Minnesota, have invented new and useful Improvements in Computing-Machines, of which the following is a specification.

The primary object of this invention is the production of a computing machine which is simple and positive in action, permitting it to be constructed of small dimensions. Coupled with these features of improvement we provide a mechanism in which the chances for mistakes and the resistance to the touch on the keys of the key board and other parts of the operating mechanism are reduced to a minimum. We also obviate the use of a locking device and of a long and uneven stroke for the various keys of the key board, the stroke in our improved machine being always the same for all of the keys and consequently producing ease and quickness of operation.

Our invention also provides a minimum number of keys, and a greater range of operation in calculating. Its construction permits of its being confined to narrow dimensions enabling its use for purposes where a wide machine is not convenient. The accumulators and gate system are also constructed, so that there is no likelihood of the parts carrying over if the keys are operated rapidly. Should a mistake be made while adding it may be easily and quickly corrected. The mechanical construction also avoids substantially all lost motion and resulting inaccuracy and wasted energy.

As distinguished from prior devices, our invention is designed to be less liable to get out of order, the operation of the adding machine is simplified, and the machine is adapted to permit greater speed and accuracy while the parts are encompassed within a small space.

Our invention also resides in the production of a novel gate system for defining the actuation of the number mechanism, said gate system being simple in construction and partly automatic in operation whereby a mechanism is produced of extremely small dimensions requiring a light short stroke of the keys for setting and also a simple device for clearing and resetting by a single movement into normal position. The carrying device employed is also particularly novel, it being adapted to carry over either in adding or subtracting and be susceptible of simple construction and care in operation and making the operation more positive in action. The gate system and carrying device also shortens the stroke of the key levers and enables the construction to be confined to small dimensions.

To these ends our invention comprises the features of construction and combination of parts which are described in the following specification and more particularly pointed out in the claims.

Figure 9:
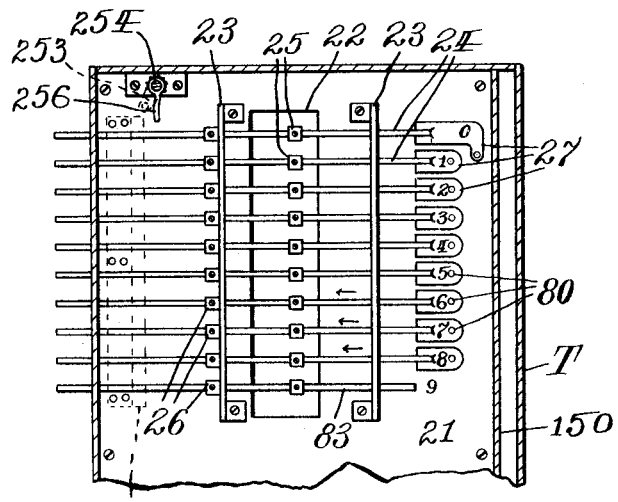
Figure 10:
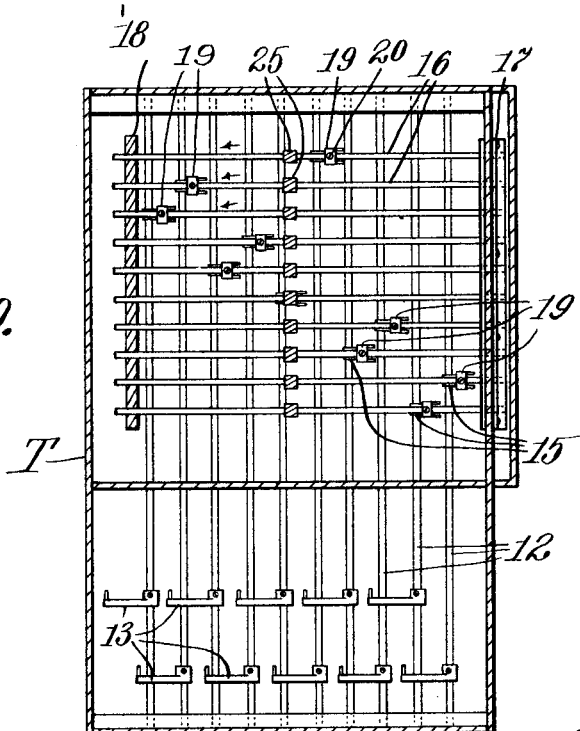
Figure 11:
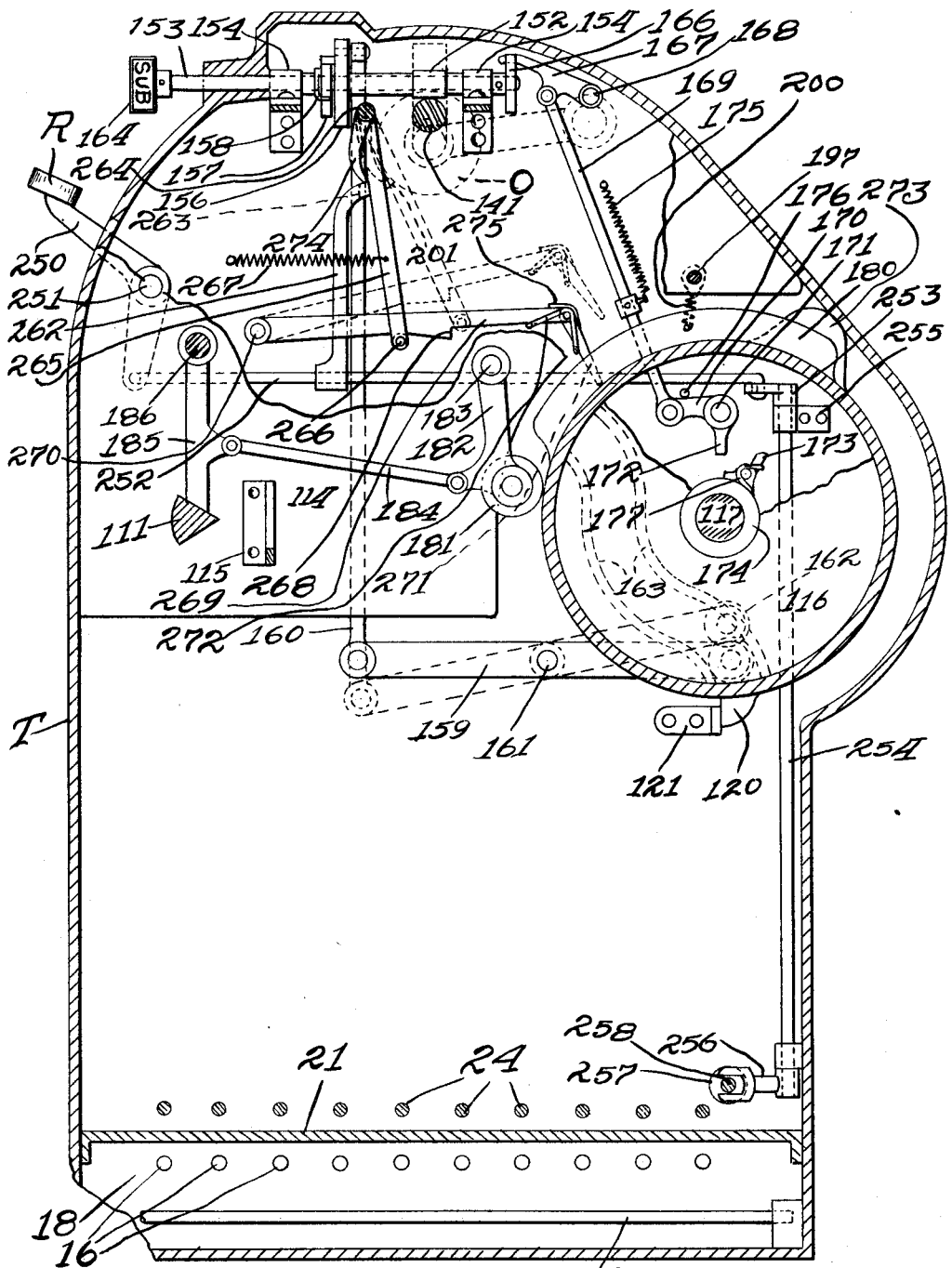
Figure 12:
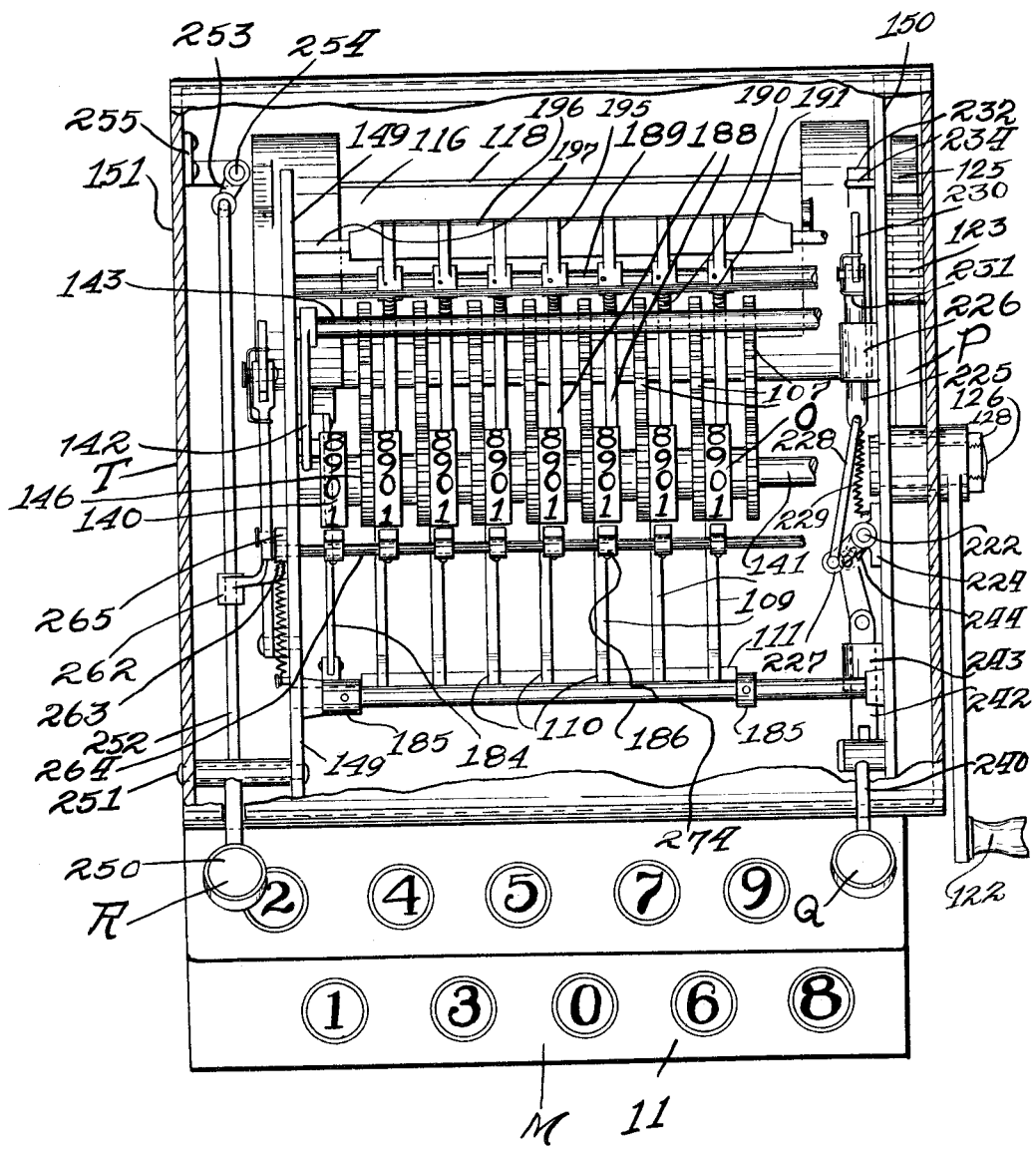

In the drawings, forming part of this specification, Figure 1 is a side elevation of our invention; Fig. 2 is a plan; Fig. 3 is a section taken on the line A—A of Fig. 4; Fig. 4 is a section on the line B—B of Fig. 3, when the parts are in normal position; Fig. 5 is a section on line B—B of Fig. 3 when the parts are in partly forward position; Fig 6 is a sectional detail taken on the line F—F of Fig. 3, the parts being moved partly forward; Fig. 7 is a side elevation taken on the line C—C of Fig. 3, the wall of the casing being removed but showing the operating lever; Fig. 8 is a plan in section of a detail showing the operating lever; Fig. 9 is a detail in section taken on the line D—D, Fig. 4; Fig. 10 is a section taken on the line E—E, Fig. 4; Fig. 11 is a section taken on the line K—K of Fig. 3, part of the structure relating to the key board being broken away; Fig. 12 is a plan with part of the casing broken away; Fig. 13 is a section on line G—G of Fig. 3, showing the carriage in its normal position; Fig. 14 is a detail partly in section taken on line G—G of Fig. 3, showing the carriage in advanced position and setting the six-gate in the unit column; Fig. 15 is a detail partly in section taken on line G—G of Fig. 3 showing the carriage returned leaving one of the gates set; Fig. 16 is a detail partly in section taken on line G—G of Fig. 3 showing the carriage advanced closing the zero gate in the unit column and advancing the six-gate to the tens column; Fig. 17 is a detail partly in section taken on line G—G of Fig. 3 showing the carriage returned to normal position after setting the gates as illustrated in Fig. 16; Fig. 18 is a detail partly in section taken on line G—G of Fig. 3 showing the carriage advanced placing the six in the hundredth column, zero in the tens column and nine in the unit column; Fig. 19 is a detail partly in section taken on the line G—G of Fig. 3 showing the carriage returned to normal position after setting the gates as illustrated in Fig. 18; Fig. 20 is a detail partly in section taken on the line I—I Fig. 3, showing the carriage in advanced position and advancing the carriage and clearing plate to clear all of the gates; Fig. 21 is a detail partly in section taken partly on line G—G, partly on line H—H, and partly on line I—I of Fig. 3 showing the carriage in normal position and all gates clear as in Fig. 13; Fig. 22 is a detail in section taken on line J—J of Fig. 13, showing the gates and associated parts enlarged; Fig. 23 is a bottom plan view of part of the carriage; Fig. 24 is a perspective view of one of the shoes; and Fig. 25 is a section on line G—G of Fig. 3, part of the carriage being broken away.

In the drawings M indicates the key board, (see Figs. 1, 2, 4 and 5), N the gate system, O the accumulating and carrying mechanism, P the operating mechanism, (see Fig. 7), R the clearing mechanism, which sets the number wheels to zero, Q the correcting mechanism which coöperates with the clearing mechanism, (see Figs. 6 and 11), and S the subtracting mechanism of our improved calculator, all of said parts being assembled in a suitable frame such as the casing T.

*Key board mechanism.*—The key board is provided with keys numbered 0 to 9, (see Figs. 1, 2, 4, 5 and 12), all of said keys being similar in construction and each key consisting of a vertical rod 10 sliding vertically through guide openings in the top 11. In the lower portion of the casing and arranged parallel in substantially a single plane are journaled a plurality of rocker shafts 12, one shaft being provided for each key and connected thereto by means of a rocker arm 13, whereby the depression of a key is adapted to turn the corresponding shaft through a short arc about its axis. A retractile spring 14 connected to the free end of the rocker arm 13 and to the top 11 of the key board is adapted to return the rocker shaft 12 to normal position after its key has been depressed and released. The rocker shafts extending backwardly the full length of the casing are provided with one actuating arm 15, for each shaft and selectively positioned thereon, so as to coöperate with a set of ten reciprocable transverse shafts 16 arranged immediately above the rocker shafts in a single horizontal plane and slidably supported in longitudinal bearings 17 and 18 (see Figs. 3, 4, 5 and 22) secured on either side of the lower part of the casing T. Each actuating arm has a bifurcated free end, the bifurcations of which are adapted to straddle one of the transverse shafts 16 and impinge against collars 19 selectively positioned on the transverse shafts by set screws 20 so that when a key of the key board is depressed the swinging motion of a longitudinal shaft is adapted through the engagement of the actuating arm 15 thereon with the collar 19 to slide transverse shafts 16 a short distance as indicated by the arrows in Fig. 10. Immediately above the set of transverse shafts 16 a horizontal partition 21 (see Fig. 4) forming part of the casing has a centrally disposed longitudinal opening 22 (see Fig. 9). Arranged on the upper surface of the partition 21 are two longitudinal parallel guides 23 positioned on either side of the opening 22 and through these guides a set of ten pull rods 24 are adapted to reciprocate, said pull rods being arranged in corresponding order immediately above the reciprocating rods 16, (see Fig. 10) each of said pull rods being coupled to a corresponding reciprocating rod by means of a rigid connection 25 passing vertically through the opening 22, there being ten pull rods. The free ends of these pull rods have sliding bearings through the casing T. Each of the pull rods is provided with a stop collar 26, (see Fig. 9) which limits the motion of the rod, on which it is mounted, in the direction of the arrows indicated in Fig. 9, and also serves as an engagement with the gate mechanism to be hereinafter described. All except one of the pull rods is illustrated with a coupling element 27 (see Fig. 9) for communicating motion from the key board to said gate mechanism. These parts substantially constitute the key board mechanism but we desire to have it understood that any suitable key board mechanism may be employed for accomplishing the result attained by our invention within the scope of the claims following this specification.

*Gate system.*—Located a suitable distance above the horizontal partition 21 is a frame 30 which carries the gates U, said gate frame being provided with horizontal strips 31 and a channel plate 32, the set of strips 31 and channel plate 32 being vertically spaced apart and mounted upon the vertical front and back plates 33 and 34 which are fastened to the casing such as by screws 35. The strips and channel plate are secured to the front and back plates by vertical screws 36 passing through said parts and into transverse spacing blocks 37, said spacing blocks forming the sides of channels 38 extending horizontally across the machine. The lower sides of the channels 38 are formed by guides 39 which are secured to the spacing blocks such as by screws 40. A suitable carriage frame such as 41 (see Fig. 4) has its side edges fitted into the channels 38 and is adapted to slide transversely below the gate frame and above the set of pull rods 24 of the key board mechanism. The strips 31 (see Figs. 4 and 13) are longitudinally spaced a short distance apart to provide longitudinal passages between them through which each of the accumulating levers 42 (see Figs. 3 and 4) is adapted to describe an arc, said levers being journaled upon a common shaft 43 forming a pivot above the gates. There is an accumulating or counting wheel for every column of figures to be added by the machine and a corresponding accumulating lever for every counting wheel, also a corresponding passage between the strips and a set of gates on one of the strips entering the passage between the strips with which a lever is adapted to coöperate. There are gates provided on each strip which are longitudinally spaced apart, and adapted to be set so as to obstruct the lever in its passage. The strip 31' (see Fig. 13) has a first zero gate 46 positioned in alinement with the first row of gates on the intermediate strips and the strip 31" is provided with eight gates in alinement with all of the remaining gates on the other strips. The transverse rows of gates are arranged to indicate from zero to eight as illustrated in Fig. 13, the zero row in other words being offset to the right and the remaining gates remaining in longitudinal alinement as indicated.

Each of the gates consists of a vertical shaft 47 (see Fig. 22) passing vertically through and freely pivoted in the channel plate 32 and one of the strips 31, a screw 48 holding said shaft at its upper end and a head 49 holding it at its lower end. Between the strip and channel plate a sleeve 50 is secured by a set screw 51, so that the shaft 47 can be removed readily from the strip and channel plate. The lower head 49 is formed with a guide shoe 52 which coöperates and is constructed in a manner to be hereinafter described. The side of the sleeve 50 is formed with a gate arm 46, which normally stands out of the path of its corresponding accumulating lever 42, (see Fig. 13) but is adapted to be swung across one of the column passages 54 between the strips 31 and thus define or limit the travel of the accumulating lever. The first zero gate 46 on the first strip 31' (see Fig. 13) controls the first column by opening the column passage between the strips or closing it while the rows of gates control the remaining columns increasing from the right in the zero column, step by step to the 8 column one row of gates, from 0 to 8 on a strip being employed for each column (see Fig. 13). Therefore there are as many rows of gates and strips as there are columns to be added within the capacity of the machine. For clearness the column passages are marked from 1 to 8 indicating units, tens, hundreds, thousands, etc., according to the capacity of the machine, it being obvious that as many sets of gates may be employed as desired. Normally the gate arms 46 in the zero row of all of the columns stand across the passages between the strips and face in substantially the opposite direction to the gate arms on the remaining gates as illustrated in Fig. 13, in which figure the gate arms are all set in normal position. The transverse row of gates representing the digit 9 it will be noted is not required, a stop 55 (see Fig. 4) common to all of the columns being secured rigidly to the stationary front plate 33 and against which the accumulator arms 42 (see Fig. 4) strike at the limit of their forward movement. The gate arms in each column and on each strip are arranged in an arc described from the pivot point 43 of the accumulator levers and the gates are evenly spaced apart, therefore even distances are produced between the gates which the accumulating arms are adapted to be stepped.

The channel plate 32 (see Fig. 13) is formed with a plurality of channels 60, which extend transversely of the machine, there being one channel for each longitudinal row of gates in which the guide shoes 52 depend between its side walls, thus there is a transverse channel for each transverse row of zero gates, an adjacent channel for each row of gates for the digit 1, another channel for the digit 2 and so on until there is a channel for every row from zero to eight. The guide shoe of each gate (see Figs 13 and 22) has its toe formed by converging sides, 61 and 62 (see Fig. 24) and a heel portion 63 connecting with said sides (see Fig. 22), leaving a space on either side of the shoe when the shaft of the shoe is turned and one of the sides 61 or 62 moved against the corresponding side of the channel in the channel plate in which the shoe is located. Thus there is space for an object such as one of the pins 64 to find its way freely lengthwise of the channel for a short distance along either side of the shoe as will be hereinafter described.

The carriage 41 consists of a main body, the projecting sides 70 of which work freely in the guide grooves 38 formed by the spacing blocks 37 and guide blocks 39 and between antifriction bearings of usual form whereby the carriage is adapted to reciprocate freely transversely of the machine. The draw springs 71 (see Fig. 13) secured to the projecting sides 70 (see Fig. 4) of the carriage and to the side of the guide 39 serve to return the carriage into normal position against the hub 72 of the lever 223 (see Fig. 13) which performs the function of a stop. This carriage supports a group of guide arms 74 (see Figs. 13 and 22) which are arranged in longitudinal and transverse rows and correspond in position and number with the guide shoes 52 (see Fig. 13). Each of the guide arms is mounted upon a shaft 75 (see Fig. 22) passing vertically through the bed of the carriage and revolubly mounted therein. On the outer end of each of the arms 74 there is an upwardly projecting pin 64 heretofore referred to, which is adapted to play freely between the guide shoes in the channels 60 of the channel plate, the normal position of these pins being illustrated in Figs. 13 and 22. The shaft 75 (see Figs 13 and 22) of each of the guide arms corresponding with the gate 46 and all of the gates controlling the first column passage has a spring 76 (see Fig. 22) attached by one end to the body of the carriage 41 and by its other end to a radiating hook 77 (see Fig. 23) rigidly secured on the shaft, said spring being adapted to return the guide arm to which it is attached automatically into normal or idle position as indicated in Figs. 13 and 23.

Each of the shafts of the remaining guide arms has an expansion spring 78 (see Fig. 22) interposed between a washer 79 on its lower end and the lower side of the body of the carriage, thus resisting the free movement of the shaft but permitting it to turn. The means of communciating motion between the key board mechanism and the gate mechanism is by vertical pins 80 mounted on all of the coupling elements 27 illustrated in Fig. 9 and projecting upwardly so as to engage the hooks 77 (see Figs. 13 to 23) and turn the guide arms 74 when one of the keys of the key board is depressed. This movement turns the guide arm corresponding with the key which is depressed and sets one of the pins 64 (see Fig. 14) in position to engage a shoe. All of the pin carrying arms 74 stand normally in one direction as illustrated in Figs. 13 to 21, excepting the arm 74′ which is the first arm in the zero row and which sets in opposite direction or with its pin 64′ on the opposite side of the zero channel in the channel plate.

The reason for placing only one shoe and one guide arm adjacent the first column passage will be evident from the following:— Each longitudinal row of guide shoes (see Figs. 13 and 14) is placed with the axis of each shoe on a longitudinal center line through the channel in which the row of guide shoes is positioned. Each shoe is placed with its toe portion radiating far beyond its axis and its heel portion close to its axis. The sides of the toe portion being shaped so that in one position one side of the toe is adapted to rest against one side of the channel leaving a clear passage adjacent the other side through which a guide pin such as 64 is free to pass and guide along the channel when the carriage is shifted forward by the depression of one of the digit keys on the key board. The heel portion of the shoe is also shaped so that a guide pin when moved by the carriage is adapted to engage with the same on one side of the channel and turn the shoe with its toe against the opposite side when the carriage is moved forward as described. It will be noted that all of the guide shoes and their toe portions point in the same general direction, the trending of the toe portions permitting the automatic operation of the guide shoes as described by means of the guide pins which are moved by the carriage. The springs 76 on the shafts 75 (see Fig. 22) tend to hold the guide arms with their pins 64 in the first column excepting the pin of the zero guide arm 74′, on the same sides of the channels normally as all of the remaining pins and guide arms, a spring on the shaft which bears the guide arm 74′ tending to hold the zero pin 64′ on the opposite side of its channel, as illustrated in Figs. 13 to 22. The positioning of the pin 64′ on the opposite side of the channel to the remainder of the pins 64 when in normal position or when any one or more of the keys has been struck is so as to always open the zero gate in the first column when any of the keys except the zero key on the key board is depressed, thus opening the first column to admit one of the accumulating arms. It is evident however that the operation of the zero pull rod 24 (see Fig. 9) will engage the hook 77 (see Figs. 22 and 23) on the arm 74′ and swing the pin 64′ to the opposite side of the channel and thus returning the shoe to normal position or prevent the swinging of the shoe 52′ (see Fig. 14) out of its normal position and leaving the first column passage closed. The stroke of the carriage is equal to or slightly in excess of the distance laterally between any two of the guide pins in a lateral row and the carriage operates fully to completely set the gates during a portion of the stroke of a key. The carriage is not subject to a step by step movement as in prior devices but is reciprocated forwardly and backwardly into normal position every time a key is struck.

Should it be desired to set the gates to register the number 609 the operation will be as follows:—When the digit key 6 (see Fig. 2) is depressed the corresponding rocker shaft 12 (see Fig. 10) operates one of the pull rods 24 (see Fig. 9) carrying the coupling element which engages the hook 77 in the six-row as illustrated in Figs. 13 to 15, of the first column, swinging the arm 85 (see Figs. 13 to 15) with its pin 86 to the opposite side of the channel in position to engage the heel of the shoe 87 (see Figs.

17 and 18) and with the forward movement of the carriage swing it to the opposite side of the channel and closing the gate 88 (see Figs. 14 and 15) in the sixth row across the first column channel. At the same time as the digit key 6 is depressed the pin 64' (see Figs. 13 to 15) on the zero arm 74' engages the shoe 52', and turns it to the opposite side of the channel thus opening the first zero gate 46 in the zero row as illustrated in Figs. 14 and 15. The collar 26 (see Fig. 22) on a pull rod 24 which carries a coupling element 27 in the six-row, engages the bracket 84 and advances the carriage into forward position. The tension of the springs 76 (see Fig. 22) is less than the tension of the springs 71 (see Fig. 14). It will be noted that Figs. 14, 16, 18 and 20 illustrate the position the parts of the gate mechanism assume in the forward portion of a stroke.

As illustrated in Figs. 15 and 17 during the backward portion of a stroke in the depression of the key 6, the pins 86 and 64' will assume their original position due to the action of the springs 76 as previously described and the pin 89 which lies just ahead of the pin 64' in the zero row is transferred to the opposite side of the channel by engaging with the surface of the shoe 52'. The pin 90 which lies ahead of the pin 86 in the six row will also be transferred in the same manner to the opposite side of the channel by engaging with the surface of the shoe 87. The pins transferred to the opposite sides are then in readiness to engage with the shoes ahead of them (see Fig. 15). When zero key is depressed, the corresponding rocker arm 13 (see Fig. 10) operates the pull rod 24 (see Fig. 9) and the connecting element 27 engages the hook 77 (see Fig. 15) in the zero row secured to the shaft 75, which carries the arm 74' and swings the pin 64' to the opposite side of the channel and in position to engage the heel of the shoe 52' (see Figs. 15 and 16). The collar 26 again engages the bracket 84 (see Fig. 3) and completes a movement of the carriage to forward position. Thus as the carriage travels forward with the pin 64' in this position and the pins 89, 90 and 86 in the position illustrated in Figs. 15 and 16, the shoe 52' will be swung back to its original position and the shoe 91 engaged by the pin 89 and swung to the opposite side of the channel at the same time the pins 86 and 90 engage the shoes 87 and 92 and set the shoes 52', 91, 87 and 92 in the position illustrated in Figs. 16 and 17. As will be seen by Fig. 16 this operation closes the first zero gate 46 in the zero row across the first column channel, opens the second zero gate 93 in the zero row which opens the second column channel, closes the gate 94 in the six row of the second column channel and opens the six gate 88 in the first column channel.

Fig. 16 illustrates the position of the parts in the forward portion of the stroke in the depression of the zero key. It will be noted the six-gate in the first column is open and the six-gate in the second column is closed. In the backward portion of this stroke, pins 64' and 89 are set to their original position, the pin 89 being set by engaging with the shoe 52' and the pin 95 which lies just ahead of the pin 89 in the zero row is transferred to the opposite side of the channel by engaging with the shoe 91. In the six-row the pin 90 is transferred to its original position by engaging with the shoe 87 and the pin 96 which lies ahead of the pin 90 in this row is transferred to the opposite side of the channel by engaging with the shoe 92 as illustrated in Fig. 17, thus setting the pins 89, 95, 64' and 96 in position to engage the respective shoes ahead of the same when the carriage is again drawn forward by the depression of the next key. Fig. 17 illustrates the position of the arms 74 and the pins which they carry at the end of the backward stroke just described. The nine key on the key board is then depressed and the corresponding rocker arm 12 (see Fig. 10) which operates the rod 83 and the collar 26 on the same which engages the bracket 84, (see Fig. 9) drawing the carriage with its arms and pins forward into the position illustrated in Figs. 17 and 18. In this operation the pin 64' will engage the shoe 52', the pin 89 will engage the shoe 91 in the zero row and the pin 95 will engage the shoe 97, and swing the respective shoes into the position illustrated in Fig. 18 in the zero column. In the six-row pins 90 and 96 will engage the shoes 92 and 98 and swing them into the position illustrated in Figs. 18 and 19. Thus as illustrated in Fig. 18 the zero gate 53 of the first column passage will be opened, the zero gate 93 of the second column passage will be closed, the zero gate 99 of the third column passage will be opened, the six-gate in the second column opened, and the gate 100 in the six-row of the third column will be closed, allowing the accumulating levers 42 (see Figs. 4, 5 and 6) to enter the first and third column passages when operated and registering on the number wheels which will be hereinafter described the total 609. The releasing portion of the stroke of the key 9 (see Fig. 2) just depressed will set the pins 89 and 95 in the position illustrated in Figs. 17 and 19, while the pin 101 which lies ahead of the pin 95 is transferred to the opposite side of the channel in readiness to operate the next succeeding shoe to open the zero gate for the next column. Fig. 19 illustrates the position of the carriage with its arms 74 and respective pins at the end of the backward stroke.

The operation of the gates and their actuating parts no matter how many columns are provided within the capacity of the machine is substantially the same as described, it being obvious that as many columns of gates are provided as is desired, in order that the machine may be designed to add an unlimited number of columns, the same number of keys as illustrated being sufficient, no matter how many columns of figures the machine is designed to compute.

*Accumulating mechanism*—In order to register the number which has been arranged by striking the keys and setting the gates a plurality of the accumulating arms 42 are provided on the shaft 43 (see Figs. 3 and 4), one arm being provided for each of the column passages, said shaft being mounted rigidly upon the casing. Each arm is formed with a toothed segment 103 concentric with the axis of the shaft 43 and also formed with a lateral extension 104 disposed at an obtuse angle to the rear edge of the arm 42. Meshing with the teeth of the segment 103 is another toothed segment 105 formed on an arm 106 which carries at its upper end a curved toothed rack 107, said segment 105 being journaled on the pivot 108, and the rack 107 being concentric with the axis of said shaft, there being one member having a segment 105, arm 106 and rack 107 for each accumulating arm 42. The pivot 108 is mounted on an angle member 109, said angle member being journaled at the apex of its angle upon the shaft 43, there being one angle member lying adjacent each accumulating arm 42, excepting the one located at the right end of the machine, which will be hereinafter described. The lower arm of the angle member 109 extends forwardly in a longitudinal direction, and is formed with a bifurcated end 110, between the bifurcations of which a lock member 111 for all of the angle members is adapted to engage normally. The other arm 109' (see Fig. 5) of the angle member extends upwardly from the pivot 43 and carries the shaft 108, the extremity of said upper arm being formed with a tooth 112 and carrying a lock pin 113 (see Fig. 6) on its side below said tooth. The lower arms of all of the angle members slide in guide grooves 114 in the guide 115 (see Fig. 6), which is secured in the casing, and steadies the angle members from lateral movement. Located back of the extensions 104 on the accumulating levers 42 is a lock in the form of a drum 116, which is mounted rigidly upon the shaft 117, which in turn is journaled in the casing. The periphery of the drum is cut away leaving a curved surface 118 concentric with the axis of the drum and normally resting against all of the rearward edges of the extensions 104, thus serving to hold the accumulating levers 42 at rest with their lower ends depending in the column passages above the zero gates. The drum is provided with an actuating coil spring 119 (see Fig. 4) secured by one end to a side of the casing and by its other end to the drum whereby the drum is adapted to be returned into normal position after being turned forwardly. The periphery of the drum is formed with a stop lug 120 (see Fig. 11) which engages with a stop 121 on a side of the casing, and which limits the revolution of the drum when its periphery engages back of the extensions 104 on the accumulating levers (see Figs. 4 and 11), but permits the motion of the drum to be reversed through the use of an operating handle 122 (see Fig. 2). The outer end of the shaft 117 (see Fig. 4) is provided with a small gear wheel 123 (see Fig. 7) and a toothed quadrant 125 has its teeth engaging the teeth of the gear wheel 123 for revolving the shaft 117, the operating arm of said quadrant being secured to a stub shaft 126 which is secured to the side of the casing and is fastened to the operating handle 122 by pins 127. The handle is held in place on the stub shaft by means of the nut 128.

To compel the operator to move the operating lever 122 a complete stroke and thus operate the accumulating device fully each time, the end of the quadrant 125 is provided with ratchet teeth 124 on its outer edge with which a spring pressed pawl 129 is adapted to engage, said pawl being pivoted between its ends at 130 on a side of the casing. A spring trip 131 is carried on the extremity of the segment 125 and is adapted to impinge against a dog 132 which is pivoted upon the side of the casing and pressed normally downward by the spring 133 with its shoulder 134 adapted to engage an end of the spring pressed pawl 129 and hold it out of engagement with the teeth of said segment, this action taking place when the segment has entirely completed the downward portion of the stroke of the handle. When the quadrant approaches the upper end of its up stroke a shoulder 135 formed below the teeth 124 engages the pawl 129 tilting it out of engagement with the teeth 124, whereupon the dog 133 engages said pawl by its shoulder 134 and holds the pawl in raised position allowing the handle 122 to return into normal position.

Located above the toothed segment out of contact with its teeth are a plurality of number wheels 140 (see Figs. 3 and 12) which are journaled freely upon a shaft 141 extending transversely in the machine and horizontally, said shaft being carried upon the outer ends of rocker arms 142 forming a carriage, which are pivotally mounted upon the shaft 143 supported by the casing, the shaft 141 having its ends working in slots 144 (see Figs. 4 and 6) in the inner walls 149 and 150 (see Fig. 3) of the casing, which define the travel of the shaft 141 and the up and down movement of the number wheels carried by said shaft. Springs 145 (see Figs. 5 and 6) secured to the casing and to the rocker arms 142 hold said arms and the number wheels in superior position with the ends of the shaft 141 in the upper ends of the slots 144. There is a number wheel of usual construction marked from 0 to 9 in the usual manner on its periphery, provided for each column, (see Fig. 3) one number wheel being adapted to coöperate with a segment 107 by its teeth 146 which are normally out of mesh with the teeth of said segment when the number wheels are in superior position. When in superior position a tooth 147 (see Fig. 6) above each number wheel and mounted upon the casing is adapted to engage between the teeth of the number wheel and hold the number wheel stationary with the desired number on its periphery appearing through its corresponding sight opening 148 in the casing (see Figs. 2 and 4). Each number wheel is turned a partial movement from one digit to another registering with the sight opening in the casing, for each step of the throw of the accumulating lever defined by the gates of each column. One end of the shaft 141 projects through one of the slots 144 (see Figs. 3, 5 and 11) which is in the wall 149 spaced a short distance from the outside wall 151 of the casing and is adapted to rest below an oblong block 152 which is mounted upon a short longitudinal shaft 153, through the turning of which the shaft 141 carrying the number wheels is depressed so that the teeth on the number wheels engage with the teeth of the segment 107. Said block is adapted to be turned into vertical or horizontal position lengthwise. A longitudinal shaft 153 (see Fig. 11) placed in the supports 154 between the walls 149 and 151 (see Fig. 3) carries a ratchet wheel 155 (see Figs. 3 and 11) which is rigidly secured thereto. Freely journaled upon the longitudinal shaft 153 adjacent the ratchet wheel 155 is a rocker arm 156, upon which a dog 157 is freely mounted and pressed into engagement with the teeth of the ratchet wheel by means of the spring 158, so that each time the dog carrying member is locked the dog 157 engages the teeth of the ratchet wheel and imparts a quarter revolution to the longitudinal shaft 153. Thus the movement of the longitudinal shaft through the engagement of its block 152 with the shaft of the carriage supporting the number wheels successively depresses the number wheels into engagement with the segment 107 and releases them. The rocker arm 156 is connected to one end of a lever 159 by the connecting arm 160 (see Fig. 11) said lever being fulcrumed between its ends upon the pivot 161 secured to the casing and having its power end provided with an anti-friction roller 162 (see Fig. 11) which is adapted to work in a cam groove 163 in one end of the lock drum 116. The lock drum 116 is adapted to revolve a portion of a revolution during each operation of the handle 122 and the cam groove 163 is so shaped that said movement of the drum during the downward stroke of the handle turns the longitudinal shaft 153 a quarter turn and resets the ratchet dog 157 in position to reëngage the ratchet wheel 155, thereby during the return stroke of the handle 122, the longitudinal shaft 153 is turned another quarter revolution and the ratchet dog reset in normal position. The instant the handle 122 (see Fig. 7) is started on the downward portion of its stroke the number wheels are shifted with their teeth in instant engagement with the teeth of the segment 107 (see Fig. 6) and out of engagement with the tooth 147, before the racks 107 move and change the position of the number wheels during the adding operation. The same is substantially true as regards the upward or return movement of the operating handle, the racks instantly disengaging from the number wheels. This instant engagement and disengagement is produced by the proper timing of the ratchet mechanism on the longitudinal shaft.

Upon the outer end of the longitudinal shaft 153 (see Fig. 11) which projects out through the casing there is a square faced key 164 forming an adding and subtracting key suitably marked for the respective operations for which the machine is adapted to be set for instance, two opposite sides are marked "Add." and the remaining sides "Subtract". The upper side of the key is adapted to indicate the position in which the machine is set and normally indicates adding. When shifted by hand to indicate subtracting the longitudinal shaft is turned a quarter revolution, thus moving the number wheel carriage down and the number wheels with their teeth into engagement with the teeth of the racks 107 (see Fig. 5). As a result when the operating handle 122 is moved in the downward portion of its stroke the ratchet mechanism turns the longitudinal shaft 153 (see Fig. 11) a quarter revolution with its block into horizontal position, thus releasing the number wheel carriage and the springs 145 (see Figs. 5 and 6) raising the number wheels with their teeth out of connection with the teeth of the segments 107. The key board having previously set the gates, the accumulating arms 42 are released by the drum 116 and their actuating springs 165 move the segments 107 into forward position according to the position the accumulating levers assume. Upon releasing the operating handle 122, (see Fig. 7) the rocker arm 156 (see Fig. 11) is moved with its dog into engagement with the ratchet wheel 155, turning the longitudinal shaft forward another quarter revolution and then releasing the rocker arm back into normal position. During this movement the number wheels are lowered with their teeth into engagement with the teeth of the racks 107, (see Figs. 5 and 6) thus revolving the number wheels backwardly in accordance with the keys which have been struck on the key board and subtracting the number on the number wheels which has been set by the key board.

The machine is provided with means for automatically turning the adding and subtracting key 164 (see Fig. 11) into adding position each time said key is set for subtracting, so that the operator can continue the operation of adding without attention to the adding and subtracting key unless it is desired to correct a mistake or continue to subtract. This resetting mechanism consists of a trip arm 166 (see Fig. 11) mounted rigidly midway between its ends on the end of the shaft 153, said arm being positioned lengthwise at right angles to the block 152 and being adapted to sweep below the free end of the dog 167 which is pivoted at 168 upon the outer wall 151 of the casing. This dog has secured between its ends a connecting rod 169 which is secured to one arm of a bell crank lever 170, said lever being pivoted at 171 on the wall 151. The free arm 172 of the bell crank lever depends in the path of a trip 173 which is pivoted on a hub 174 of the drum. The connecting rod 169 is drawn upwardly by the spring 175, one end of which is connected to the rod and the other end to the wall 151, said spring 175 tending to hold said rod and dog 167 in raised position, normally out of the path of the movement of the trip 166. The upward movement of the dog 167 and its connected parts is limited by the stop 176 on a wall 151 of the casing. The trip 173 is pivoted between its ends, its upper arm being pressed back by a spring 177 which causes the upper arm to be held in upper position with its lower arm pressing against the hub 174, but permitting the upper arm to tilt downwardly over a depending arm 172 of the bell crank lever 170 when the drum is being moved in forward direction by the downward portion of a stroke of the operating handle, but positively engaging with said depending arm 172 and tilting the dog 167 down during the return portion of the stroke of the operating lever. Thus when the adding and subtracting key is set for subtracting the dog 167 engages the trip 166 which is lying horizontally in the path of the trip and turns the shaft 153 a quarter turn with an adding indication turned uppermost, when the drum returns to normal position.

The lock drum 116 is formed with a cam 180 (see Fig. 11) on its periphery which is adapted to impinge against an antifriction roller 181 journaled between the ends of the lever arm 182. This lever arm is hung from the wall 149 by a pivot 183 and has its lower free end connected by the link 184 with the hanger 185 which carries the aliner 111. The hanger 185 is pivotally hung from the shaft 186 on the walls 149 and 150 and has at its lower end the aliner 111 which is in the form of a wedge adapted to enter the V-shaped openings in the bifurcated ends of the angle members 109 (see Figs. 4 and 11). A spring 187 (see Fig. 5) secured to the casing and to the hanger tends to hold the aliner wedge in the bifurcated ends of the angle members. The segments 107 are thereby held in transverse alinement normally when the aliner 111 enters the bifurcated ends, and the cam 180 (see Fig. 11) is so shaped as to press against the antifriction roller 181 and lift the aliner out of engagement with the angle members during the entire downward portion of the stroke of the operating handle 122. The aliner 111 remains out of engagement with the angle members until the end of the upward stroke of the handle 122 whereupon the cam 180 releases the aliner back into engagement with the angle members bringing all of the angle members and the segments 107 back into normal position. The upper ends 109' of the arms 109 which carry the lock pins 113 are held normally in alinement by lock arms 188, (see Figs. 3 and 4) there being one lock arm for each of the upright arms 109' of the angle members 109. Each lock arm 188 is mounted on a shaft 189 common to all of the lock arms and mounted upon the walls 149 and 150 and each lock arm has its free end drawn upwardly by a spring 190 secured thereto, and to a transverse rod 191 secured horizontally to the sides of the casing. The free ends of the lock arms are formed with openings 192 (see Fig. 6) through their sides, the lower edge of each opening being formed with a pair of upwardly projecting teeth 193. When the upper arms 109' (see Fig. 3) of the angle members 109 are in upright position normally the lock pin which it carries meshes between the pair of teeth 193, thus locking the angle members in alinement normally when the aliner 111 is out of connection with the bifurcated ends of the lower arms 109. Each of lock arms 188 (see Fig. 4) is formed with an extension 195 from the shaft 189 against which a cam 196 common to all of the extensions 195 is adapted to impinge and depress the lock arms 188 against the tension of their springs 190 and move the free ends of the lock arms with their teeth 193 (see Fig. 6) out of engagement with the lock pin 113. The cam 196 is journaled upon the shaft 197 (see Fig. 4) secured to the ends of the casing and carries a depending arm 198 against which a projection 199 on the periphery of the lock drum impinges during the revolution of the drum immediately before the operating lever 122 (see Fig. 7) reaches its next position and when the aliner 111 alines the angle members 109. A spring 200 (see Figs. 3 and 11) holds the dog 196 in normal position as illustrated in Figs. 4, 5, 6, and 11, but permits the dog to be turned when the projection 199 moves in either direction.

*Carrying mechanism of number wheels.*— The number wheels and racks move in the direction of the arrows indicated in Figs. 5 and 6 during the operation of adding and when the rows are carried over from one column to a higher order, for instance from 9 to 10, the number wheel in the units column coöperates with the teeth of the segment, representing the tens column which is automatically stepped forward, so that zero on the unit number wheel appears through its sight opening instead of 9 and the "one" on the tens number wheel appears through its sight opening instead of zero. For accomplishing this result and carrying the items over from column to column each number wheel is formed with a broad faced tooth 201 (see Figs. 3, 4, 5 and 6) extending laterally and projecting beyond the periphery on the face of the number wheel. This broad faced tooth 201 is adapted when the number wheels have been swung downwardly by their carriage 142 and when the wheel is revolving to engage the upwardly projecting edge 206 on the lock arm 188 and depress said arm with its teeth 193 (see Fig. 6) out of engagement with the lock pin 113. The short end of the broad faced tooth 201 (see Fig. 3) thereupon engages the tooth 112 (see Figs. 4 and 5) on the upper extremity of the arm 109' and tilts said arm forward bearing the tooth so engaged and moving the segment 107 and angle members 109 into the position illustrated in Fig. 6. In this position, it will be noted that the segment 107 would for illustration represent a number carried over from 9 to 10, while the unit angle member is left in normal position and that the tens angle member has been tilted forward until the lock pin 113 has dropped into the forward recess 207 (see Fig. 6) beyond the teeth. In case of subtracting this action is reversed, the lock pin dropping in the backward recess 208, and the number wheels revolving in the opposite direction as previously described. This operation is the same in connection with all of the segments and number wheels whenever an item is carried over from 9 to 10.

The accumulating lever 42 and segment 204 (see Fig. 3) coöperating therewith which are located at the right end of the machine are similar in construction to the remaining accumulating levers 42 and segments 107, but there is no angle member such as 109, (see Fig. 5) in connection therewith. The segment 204 (see Fig. 3) is pivoted on the stationary bracket 205 secured to the casing and as the segment 204 coöperates with the number wheel at the extreme right end of the machine representing items in the units column, it revolves its coöperating number wheel beyond a complete revolution and coöperates with the number wheel of the next higher order. The carrying from one wheel to another of next higher order is effected by the segment of the wheel of next higher order being advanced one space through the motion of angle member 109, (see Fig. 5) which is forced forward by the tooth 201 (see Fig. 3) of the wheel of lower order.

Each number wheel acts on a segment 107 (see Fig. 6) ahead through the lock bar 188 and angle element 109 (see Fig. 4) as described thereby advancing items on the number wheels from column to column until the limit of capacity of the number wheels is reached. As many number wheels and sets of coöperating mechanism may be provided in the machine as desired, the key board constituting two keys being sufficient for any number of columns.

*Mechanism for clearing machine.*—It is necessary in machines of this character to clear the mechanism after each operation of setting an item and also to occasionally clear the entire machine by returning all of the computing wheels to zero position or to that position where the naughts on the wheels show through the sight openings 148 (see Figs. 2 and 4) in the top of the casing.

For the purpose of clearing the mechanism after each operation of setting an item in the columns by the key board the following mechanism is provided. Slidably mounted upon the bed of the carriage and adapted to move fore and aft of the machine is a clearing plate 210, (see Figs. 6, 20, 21 and 22) said plate being formed with a plurality of transverse slots 211. This plate is formed with longitudinal slots 212 (see Fig. 20) forming guides on the plate over screws 213 passing through spacing collars 214 (see Fig. 3) into the bed of the carriage, thus permitting the clearing plate to reciprocate longitudinally on the carriage, but being carried transversely by the carriage at the same time. The spacing collars hold the clearing plate above the bed of the carriage, so that the gate arms 74 (see Fig. 3) are free to turn below them. The zero row of guide pins 64 (see Figs. 19 and 20) lie spaced beyond the rearward edge of the guide plate in normal position, excepting the first pin 64′ which presses against and is adapted to be moved by the plate into forward position in alinement with the remaining pins of the zero row when the plate is advanced in clearing operation (see Fig. 20). Each row of guide pins from 1 to 8 is arranged in the slots 211 of the clearing plate as illustrated in Figs. 20 and 21, each row of pins lying normally against the back edge of the respective slots in which the row of pins is located. Those pins which have been turned down by the operation of the keys are thus adapted to be returned into normal position by the sides of the slots and the rearward edge of the gate plate when the clearing plate is advanced rearwardly, thus all of the pins are adapted to be set in normal position by the clearing plate with the exception of pin 64′, (see Fig. 21). The guide slots 212 are of sufficient length to allow the clearing plate to reset the pins in normal position, the width of the slots 211 containing the guide pins being substantially equal to the length of slots 212. The movement of the clearing plate is primarily controlled by the operation of the handle 122 (see Fig. 7) through the lock drum 116, (see Fig. 4) the following mechanism being interposed between the lock drum and the clearing plate, so that during the operation of the lock drum at the end of the return portion of its stroke, the clearing plate is automatically operated and the guide pins reset in normal position as shown in Fig. 21. A pair of springs 215 (see Fig. 20) interposed between and secured by their ends to the bed of the carriage and to the clearing plate serve to slide the clearing plate backward to reset the guide pins in normal position.

Mounted upon the bed of the carriage is a lever 216 (see Fig. 16) which is fulcrumed between its ends by the pivot 217, the outer end of said lever being connected by an actuating spring 218 to the bed of the carriage, the tension of said spring being stronger than the combined tensional strength of the springs 215. The inner end of the lever 216 is formed with a forwardly and outwardly extending operating arm 219 and an inwardly extending stop arm 219′ which strike against a pin 220 mounted upon the clearing plate so that the tendency of the lever is to hold the clearing plate in forward position, normally as illustrated in Figs. 15 and 21. Journaled adjacent the operating arm 219 in a bracket 221 on a side of the casing is a vertical shaft 222 (see Figs. 3 to 5 and 12 to 21) upon which a broad faced lever 223 is mounted having its free end adapted to swing against the outer end of the operating arm 219 to relieve the stop arm 219′ from against the pin 220 and allow the clearing plate to be moved backwardly by its springs 215. The early portion of the stroke of the lever 223 performs the function described of relieving the stop arms 219′ from pressing against the pin 220. The continued motion of the lever 223 during the first one-half of the stroke of the broad faced lever causes the broad faced lever to strike against the lateral edge of the carriage, and move the clearing plate and carriage laterally to the left against the tension of the draw springs 71. This lateral movement causes the pins 64 to be guided to the backward sides of the channels 60, (see Figs. 20 and 21) in which the guide shoes are located, and at the same time said pins guiding the shoes which have been previously set into their normal position. Fig. 20 illustrates the extreme position of the carriage when the shoes and the pins have been reset into normal position. As the lever 223 is released by the shaft 222 (see Fig. 20) the carriage moves from the position illustrated in Fig. 20 back into the position illustrated in Fig. 21 in which position all of the pins remain in the same general direction excepting the pin 64′ which is returned by its spring 76 (see Fig. 22) against the rearward edge of the clearing plate as illustrated in Fig. 21.

The upper end of the vertical shaft 222 (see Figs. 3, 4, 5 and 12) is journaled in the bracket on the wall 150, and is connected to a sliding member 225 which is mounted in the guide 226 on said wall by means of the arm 227 and the connecting link 228. The sliding member 225 is assisted in being held in normal position by means of the spring 229 which is fastened to the wall 150. One end of the sliding member 225 carries the catch 230, which is pivoted thereto and free to move up and down on its outer end, said catch being pressed downwardly upon the periphery of the lock drum 116 by means of the spring 231. The catch 230 has a shoulder which is adapted to engage over a shoulder 232 on the periphery of the drum when the drum reverses after it has been moved forward by the operating handle. The drum thus slides the member 225 in its guide and turns the shaft 222 through a short arc, until the beveled end 233 of the catch, guides over a releasing pin 234 on the wall 150, whereupon said pin lifts the catch against the tension of its spring 231 out of engagement with the shoulder 232. As soon as the catch is released from said shoulder the spring 229 returns the shaft with its coöperating parts including the carriage and clearing plate into normal position, the springs 71 connected to the carriage assisting in this operation. Thus the clearing plate is operated and the guide pins which coöperate with the guide shoes are reset in normal position every time the handle 122 is operated after an item has been set by the key board leaving the gates in readiness to be set for a new number or item.

For the purpose of correcting a mistake when the wrong number has been set by the key board, and for clearing the gate mechanism the key Q in the form of a bell crank lever 240 is pivoted at its angle upon the wall 150 near the front of the casing. One arm of this bell crank lever extends through a slot in the casing and is adapted to be swung up and down while the other arm depends in the casing through a loop 241, (see Fig. 4) which is integral with a rod 242 mounted in the guide 243 on said wall. The inner end of this rod is pivotally and slidably secured (see Fig. 12) to an arm 244 which is mounted upon the shaft 222 and adapted to be swung thereby. Thus by depressing the correcting key Q the shaft 222 (see Figs. 7 and 12) can be turned sufficiently to actuate the clearing plate 210 at any time desired without depressing the operating handle 122 and in this manner correcting a mistake.

For the purpose of clearing the entire machine and returning all of the computing wheels into zero or normal position the following mechanism is provided. The clearing key 250 (see Figs. 11 and 12) is pivoted at 251 between the walls 149 and 151, (see Fig. 12) and works through a slot in the front of the casing. This key has a depending arm below its pivot support which is connected by the rod 252 (see Figs. 3 and 11) secured to the free end of the swinging arm 253 (see Figs. 11 and 12) on the upper end of a vertical shaft 254. This shaft is journaled in the brackets 255 mounted upon the casing and its lower arm carries the swinging arm 256, (see Fig. 11) which is adapted to engage a collar 257 mounted upon a reciprocable shaft 258 (see Figs. 11 and 13). This reciprocable shaft is mounted in two bearings 84 and 259 (see Fig. 25), depending from the carriage 41, said shaft extending transversely on the rear portion of said carriage, and carrying a series of collars 260 which engage with arms 261, which are secured rigidly to the shafts 75 (see Figs. 15 to 22). The series of collars and arms 261 are so arranged that when the reciprocable shaft is moved forward by the depression of key 250, the shafts 75 on the guide arms 74 are turned, said shafts 75 being returned to normal position by the clearing plate. The shafts bearing the arms 261, which are engaged by the collars 260, are all located in the zero row of the carriage, so that when the clearing key is operated, all of the zero gates are opened to admit the rack bars and when the operating lever is depressed and operated, the number wheels are turned back to zero position. During the first portion of the turning of the shaft 254 (see Fig. 11) the arms 74 (see Figs. 20 and 22) are thrown into the position illustrated in Fig. 25, and during the latter part of the stroke the carriage is shifted forward a step causing the zero gates to be opened. This portion of the operation taking place before the depression of the operating lever 122 (see Fig. 2). It will be noted that the end operating pin 64' (see Fig. 25) is not engaged by the reciprocable shaft as it sets normally in position to operate its guide shoe. The connecting rod 252 (see Figs. 3 and 11) has mounted thereon the carrier arm 262, the upper end of which carries a transverse rod 263. Positioned in front of the number wheels is a transverse shaft 264, the ends of which are journaled in the walls 150 and 149 (see Fig. 3). One end of this shaft extends through the wall 149 and carries a depending arm 265 (see Fig. 11), the lower free end of which carries a pin 266. This depending arm is held normally in position as illustrated in Fig. 11 against the transverse rod 263 on the carrier arm 262 by means of the spring 267 and the pin 266 is adapted to engage the shoulder 268 on the longitudinal arm 269. One end of this longitudinal arm is pivoted at 270 on the wall 149 and its free end is adapted to swing up and down carrying with it a pivoted dog 271 which hangs downwardly and is urged upwardly by a spring 272, a stop 275 formed on the dog 271 being adapted to limit the upward swinging movement of the dog in one direction. This dog hangs over the periphery of the stop drum and when the stop drum is revolved by the operating handle a cam shoulder 273 on the stop drum is adapted to sweep against said depending dog 271.

During the down stroke of the operating lever 122, said dog 271 permits the shoulder 273 to pass without tilting the lever 269 up. During the return stroke of the operating lever the drum returning causes the shoulder 273 to impinge against the dog 271, and lift the lever 269 into uppermost position indicated by the broken lines in Fig. 11. Before the operating lever is operated and when the key 250 is depressed the carrier arm 262 (see Figs. 11 and 12) causes the arm 265 to be tilted forward until the pin 266 on its lower end guides into engagement with the shoulder 268. The intermediate position indicated by broken lines in Fig. 11 illustrates the tilting movement of the levers 265 and 269 while the pin 266 is in the act of engaging the shoulder 268. Thus after the key 250 has been depressed the arm 265 is locked into engagement with the arm 269 in readiness so that when the operating lever is depressed and released the lock drum is adapted during its movement to actuate the arm 269 into uppermost position indicated by the broken lines in Fig. 11 and release the pin 266 and the arm 265 into normal position. During the tilting of the arm 265 its shaft 264 (see Fig. 11) is rocked through a short arc. This shaft 264 carries a series of stop arms 274 (see Figs. 3 and 11), one arm being provided for each number wheel and its lower end being adapted to engage the front of it back of the tooth 201 carried by each number wheel as illustrated in dotted outline in Fig. 11. The teeth 201 are positioned on the number wheels so that when the stop arms engage the teeth, all of the naughts on the number wheels register through the sight openings in the top of the casing. In this manner by the actuation of the key 250 and the operating lever 122 the number wheels are set in zero position in readiness for starting. The upstroke of the operating lever 122 and drum 116 causes the clearing plate to reset the gates and coöperating parts in normal position.

In accordance with the patent statutes we have described the principles of operation of our invention together with the apparatus which we now consider to represent the best embodiment thereof but we desire to have it understood that the construction shown is only illustrative and that the invention can be carried out by other means and applied to uses other than those above set forth within the scope of the following claims.

Having described our invention, what we claim as new and desire to protect by Letters Patent is:—

1. A counter wheel with gear actuating means, a gate device controlled by a key board and adapted to intercept the throw of said gear actuating means and define the movement of said wheel, a carriage having elements directly coöperating with said gate device returnable into normal position after each and every operation of a key, and an operating device for causing said counter wheel and its actuating means to move after said gate device has been operated, whereby the movement and space occupied by said parts are minimized.

2. A series of counter wheels with gear actuating means, a series of gates controlled by a key board adapted to intercept the throw of said gear actuating means and define the movement of said wheels, a carriage having elements for setting the gates by its forward movement and returnable into normal position after every operation of a key in said key board, and an operating device for causing said counter wheels and their actuating means to move after said gates have been set, said wheels adapted to carry over from the units column to the tens column automatically according to the position assumed by said gates.

3. A series of counter wheels with actuating means for each wheel, a series of gates adapted to define the movement of said actuating means and said wheels to indicate selected items, a plurality of guides for actuating said gates and a plurality of keys coöperating with part of said guides to set part of said gates and assist in causing the automatic operation of the remaining guides and gates.

4. A series of counter wheels with actuating means therefor, a series of gates adapted to define the movement of said actuating means and turn said wheels to indicate selected items, a plurality of guides for actuating said gates, a plurality of keys coöperating with said guides to set said gates, and a clearing element and carriage coöperating together for returning all of said gates and guides to normal position simultaneously when said actuating means is completing its operation.

5. A series of counter wheels, actuating means for moving said wheels into position to indicate a computation, a system of gates arranged to define the movement of said actuating means according to the items to be added, a system of adding keys, mechanism interposed between said keys and gates for setting the latter to define the movement of said actuating means according to the items struck by said keys, means for releasing said actuating means, and means controlled by said releasing means for automatically resetting said gates in normal position.

6. A computing machine, comprising in combination, a series of counter wheels having actuating members, a gate system associated with said parts and adapted to define the movement of said actuating members, said gate system comprising a channel member, a plurality of gates arranged in longitudinal and transverse rows, each gate carrying a guide shoe in the channels of said channel member, a guide pin co-acting with each of said shoes and movable across and longitudinally in said channels, and a system of keys adapted to actuate the pins in said channels, whereby a gate is adapted to be set in the path of one or more of said number wheel actuating members by striking certain of said keys.

7. A computing machine, comprising, in combination, a series of counter wheels having actuating members, a gate system associated with said parts and adapted to define the movement of said actuating members, said gate system comprising a channel member, a plurality of gates arranged in longitudinal and transverse rows, each gate carrying a guide shoe in one of the channels of said channel member, a plurality of guides co-acting with said shoes and movable across and longitudinally in said channels, a system of keys adapted to actuate said guides, whereby a gate is adapted to be set in the path of a corresponding number wheel actuating member by striking one of said keys, a clearing plate associated with said guides and movable to reset said guides in normal position after they have been moved through the actuation of said keys and means for moving said clearing plate.

8. The combination with a series of counter wheels, of selecting and operating means, comprising a gear, a segment and a device for moving the bearing of said segment forward to cause the fractional part of a revolution of a number wheel, for the purposes specified.

9. The combination with a series of counter wheels of selecting and operating means, comprising, a gear for each of said wheels, a plurality of segments having teeth meshing with the teeth of said gears and means for moving the pivot bearing point of said segments to cause part or all of the number wheels to move a fractional part of a revolution, for the purposes specified.

10. The combination with a series of counter elements, actuating means for each of said elements, key elements, a reciprocable carriage movable forwardly and backwardly into normal position every time a key element is struck, a plurality of main and auxiliary gates adapted to define the movement of said actuating means and respectively main and auxiliary actuating shoes, said main and auxiliary guides co-operating respectively with said main and auxiliary shoes, said main guides and carriage being connected with said key elements to be operated thereby and all of said guides and shoes coöperating with said carriage, whereby the reciprocation of the carriage is adapted to carry over numbers set in the units column to effect the setting of corresponding gates in columns of higher denomination as the keys are struck.

11. The combination with a series of number wheels, of selecting and operating means, comprising, a gear for each of said wheels, a plurality of segments having teeth meshing with the teeth of said gears, said number wheels and gearing being movable into and out of engagement with the teeth of said segments during the operation of adding and subtracting, means for moving said segments to revolve said gears and number wheels, means for limiting the forward movement of said segments, means for returning said segments into normal position, and means for controlling the connection of said number wheels and segments to change the adding and subtracting operation of the machine.

12. The combination with a series of number wheels, of selecting and operating means, comprising, a gear for each of said wheels, a plurality of segments having teeth adapted to mesh with the teeth of said gears, said number wheels and gears being movable into and out of connection with the teeth of said segments, means for holding said segments in normal position with the teeth of said gears out of connection with the teeth of said segments, means for moving said segments in forward direction to revolve said gears and number wheels, means for reversing said segments while their teeth are engaged with the teeth of said gears to reverse the motion of said number wheels, said forward and reverse movements being adapted for changing from the operation of adding or subtracting, and means for limiting the forward movement of said segments.

13. In a calculating machine, the combination of number wheels, actuating elements for said number wheels, gates adapted to control the position of said actuating elements and provided with guide shoes, a member formed with channels having a row of said shoes arranged in each channel, each of said shoes being pivoted on an axis and formed with a pair of guide surfaces radiating and converging from said axis, a plurality of guides co-acting with said shoes and movably supported in position to control the movement of said shoes and a plurality of keys primarily controlling said guides.

14. In a calculating machine, the combination of number wheels, actuating elements for said number wheels, gates adapted to control the position of said actuating elements and provided with controlling elements, a member formed with channels having a row of said controlling elements in each channel, each of said controlling elements being pivoted on an axis and formed with a pair of guide surfaces radiating and converging from said axis, a plurality of guides co-acting with said shoes and movably supported in position to control the movement of said controlling elements, a plurality of keys primarily controlling said guides, and means for resetting said guides and gates in normal position.

15. In a calculating machine, the combination of number wheels, actuating elements for said number wheels, gates adapted to control the position of said actuating elements and provided with a primary set of controlling elements representing a unit column of figures and secondary sets of controlling elements representing columns of figures upward of said units column, a member formed with sides between which each set of controlling elements is movably supported and limited in movement thereby, each of said controlling elements being pivoted on an axis and formed with a pair of guide surfaces radiating and converging from said axis, a plurality of guides co-acting with all of said controlling elements and movably supported between said sides and limited in movement thereby, keys adapted to actuate the primary set of controlling elements and means for transmitting the movement of the primary controlling elements to the secondary elements when one of said keys is struck to indicate a numeral in a column of higher order.

16. In a calculating machine, the combination of number wheels, actuating elements for said number wheels, gates adapted to control the position of said actuating elements and provided with a primary set of controlling elements representing a unit column of figures and secondary sets of controlling elements representing columns of figures upward of said units column, a member formed with sides between which each set of controlling elements is movably supported and limited in movement thereby, each of said controlling elements being pivoted on an axis and formed with a pair of guide surfaces radiating and converging from said axis, a plurality of guides co-acting with all of said controlling elements and movably supported between said sides and limited in movement thereby, keys adapted to actuate the primary set of controlling elements, means for transmitting the movement of the primary controlling elements to the secondary elements when one of said keys is struck to indicate a numeral in a column of higher order and means for resetting said guides and gates in normal position.

17. A series of counter wheels with actuating means for each wheel, a plurality of keys forming a key board, a plurality of main gates having shoes, a plurality of auxiliary gates having shoes, a plurality of main guides coöperating with said main shoes, and a plurality of auxiliary guides coöperating with said auxiliary shoes, all of said gates being adapted to define the movement of said actuating means, said keys coöperating with said main guides to set said main gates and said auxiliary guides coöperating with said main shoes and guides to set said auxiliary gates automatically.

18. The combination with a series of counter elements, actuating means for each of said elements, key elements, a plurality of main and auxiliary gates having shoes and adapted to define the movement of said actuating means, a plurality of main and auxiliary guides respectively coöperating with the shoes on said main and auxiliary gates, said key elements coöperating with said main guides to cause the setting of said main gates and said auxiliary guides coöperating with the main shoes and guides to set said auxiliary gates automatically.

19. In a calculating machine, a plurality of number elements, a plurality of gates adapted to define the movement of said number elements, a primary set of controlling elements effecting the setting of said gates, a secondary set of controlling elements also governing the setting of said gates and a key board having keys adapted to effect the setting of said primary controlling elements, said secondary controlling elements being operated by said primary controlling elements to set figures of a higher denomination than in the units column.

20. In a calculating machine, a plurality of number elements, a plurality of gates adapted to define the movement of said number elements, a primary set of controlling elements effecting the setting of said gates, a secondary set of controlling elements arranged in divisions, one for each column of figures to be added upward above the units column, said divisions being controlled successively upwardly, the division in the tens column being controlled by the primary set of controlling elements, the division in the hundreds column by the controlling elements in the tens column and so on upwardly and a key board having keys controlling the operation of the primary controlling elements.

21. The combination with a series of counter elements, actuating means for each of said elements, key elements, a plurality of main and auxiliary gates adapted to define the movement of said actuating means and having respectively main and auxiliary actuating shoes, main and auxiliary guides coöperating respectively with said main and auxiliary shoes, and a reciprocable carriage, said main guides and carriage being connected with said key elements to be operated thereby and all of said guides and shoes coöperating with said carriage, and adapted by a forward movement of said carriage to effect the setting of the gates corresponding with the keys which have been struck and by the backward movement of said carriage to cause a shoe to set a guide arm in position to effect the setting of the gate ahead of it upon a subsequent movement of the carriage.

22. The combination with a series of counter elements, actuating means for each of said elements, key elements, a plurality of main and auxiliary gates adapted to define the movement of said actuating means and having respectively main and auxiliary actuating shoes, main and auxiliary guides coöperating respectively with said main and auxiliary shoes, and a traveling carriage, said main guides and carriage being connected with said key elements to be operated thereby and all of said guides and shoes coöperating with said carriage, and adapted by one movement of said carriage to effect the setting of the gates corresponding with the keys which have been struck and by another movement of said carriage to cause a shoe to set a guide in position to effect the setting of the gate ahead of it upon a subsequent movement of the carriage.

23. In a calculating machine, a gate for defining the movement of a number element, having a primary shoe pivoted upon an axis and formed with guide surfaces, a primary guide adapted to tilt said primary shoe and a secondary guide adapted to coöperate with a guide surface of said shoe to be moved thereby.

In testimony whereof, we have signed our names to this specification, in the presence of two subscribing witnesses.

NICHOLAS J. KLOHN.
HERMAN J. HEDTKE.

Witnesses:
H. L. Fischer,
F. G. Bradbury.

Copies of this patent may be obtained for five cents each, by addressing the "Commissioner of Patents, Washington, D. C."